United States Patent
Kakiuchi

(10) Patent No.: US 8,294,428 B2
(45) Date of Patent: Oct. 23, 2012

(54) ELECTRICITY ACCUMULATING DEVICE

(75) Inventor: Kimiyasu Kakiuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 323 days.

(21) Appl. No.: 12/810,917

(22) PCT Filed: Jan. 6, 2009

(86) PCT No.: PCT/JP2009/000004
§ 371 (c)(1),
(2), (4) Date: Jun. 28, 2010

(87) PCT Pub. No.: WO2009/087956
PCT Pub. Date: Jul. 16, 2009

(65) Prior Publication Data
US 2010/0283434 A1    Nov. 11, 2010

(30) Foreign Application Priority Data

| Jan. 7, 2008 | (JP) | ................................ 2008-000330 |
| Jan. 7, 2008 | (JP) | ................................ 2008-000331 |
| Jan. 7, 2008 | (JP) | ................................ 2008-000332 |

(51) Int. Cl.
*H02J 7/00* (2006.01)
*H02M 3/18* (2006.01)

(52) U.S. Cl. ........ 320/166; 320/118; 320/119; 320/121; 307/110

(58) Field of Classification Search .................... 320/166
See application file for complete search history.

(56) References Cited

U.S. PATENT DOCUMENTS

| 7,271,505 B1 * | 9/2007 | Miettinen ..................... 307/110 |
| 7,400,114 B2 * | 7/2008 | Anzawa et al. ............... 320/119 |
| 7,531,987 B2 * | 5/2009 | Ohasi et al. .................... 320/116 |
| 2004/0263121 A1 * | 12/2004 | Thrap ........................... 320/119 |
| 2009/0039830 A1 | 2/2009 | Pellenc |

FOREIGN PATENT DOCUMENTS

| JP | 2007-124883 A | 5/2007 |
| WO | WO 2005/055358 A2 | 6/2005 |

OTHER PUBLICATIONS

International Search Report for International Application No. PCT/JP2009/000004, Apr. 7, 2009, Panasonic Corporation.

* cited by examiner

*Primary Examiner* — M'Baye Diao
(74) *Attorney, Agent, or Firm* — RatnerPrestia

(57) ABSTRACT

An electricity accumulating device includes capacitors connected in series, balanced voltage adjusting portions connected to the capacitors respectively, and a control circuit connected to the balanced voltage adjusting portions. The control circuit performs the following operations: measuring two voltages at different times from each other across each capacitor during the non-charge-or-discharge period of the capacitors by using the balanced voltage adjusting portions; calculating the absolute value of the difference between the two voltages; determining the balanced voltage of each of the capacitors according to the absolute value; and controlling the balanced voltage adjusting portions to make the voltage across each capacitor a balanced voltage.

17 Claims, 13 Drawing Sheets

ELECTRICITY ACCUMULATING DEVICE

THIS APPLICATION IS A U.S. NATIONAL PHASE APPLICATION OF PCT INTERNATIONAL APPLICATION PCT/JP2009/000004.

TECHNICAL FIELD

The present invention relates to an electricity accumulating device having capacitors for storing and discharging electric power.

BACKGROUND ART

With increasing concern for the environment in recent years, electric and hybrid cars, which are wholly or partially driven by a motor, are growing in popularity. In these cars (hereinafter, vehicles), the electric power of the motor is supplied from a battery. Such batteries, however, are likely to change their characteristics or to be degraded while being rapidly charged or discharged with a large current. To avoid this, restrictions are imposed on the current supplied to the motor when the driver tries to accelerate too fast. This, however, sometimes makes acceleration insufficient.

To overcome this problem, there have been proposed vehicles having both a battery and capacitors with rapid charging-discharging characteristics. In such vehicles, the motor is supplied with electric power from both the battery and the capacitors when the driver tries to accelerate too fast. As a result, the vehicle can be accelerated faster than in the case of having a battery only.

To obtain a voltage high enough to drive a motor from capacitors, assuming that the voltage is about 750V, it is necessary to connect 300 capacitors each having a rated voltage of 2.5V in series. There are also cases in which some capacitors are connected in series and the others are connected in parallel to provide a necessary capacitance.

Capacitors, however, have variations in characteristics, and therefore, are applied with different voltages from each other. If charged without considering this, capacitors may be degraded, thereby shortening their life.

Under such circumstances, there have been proposed electricity accumulating devices in which a large number of capacitors have small variations in the degree of degradation, and hence, a long life.

FIG. 13 is a block circuit diagram of a conventional charging device. As shown in FIG. 13, the electricity accumulating device includes capacitors 501 connected in series, and balanced voltage adjusting portions 503 connected to capacitors 501 at their both ends. Each capacitor 501 is also connected at its both ends via two switches 507 to a corresponding sampling capacitor 505 for measuring the voltage across the corresponding capacitor 501. Balanced voltage adjusting portions 503 and switches 507 are connected to controller 509. Although it is not illustrated, capacitors 501 connected in series are also connected to the motor, the generator, the battery, the loads, and other components of the vehicle via charge-discharge circuits.

Each balanced voltage adjusting portion 503 includes a series circuit connected to both ends of the corresponding capacitor 501. The series circuit includes balance switch 511 and balance resistor 513. Each balanced voltage adjusting portion 503 also includes two partial pressure resistors 515 connected in series, which are also connected to both ends of the corresponding capacitor 501. The connection point of two partial pressure resistors 515 is connected to one input of comparator 517. The other input of comparator 517 is connected to digital potentiometer 519. Digital potentiometer 519 is connected to reference supply 521 and controller 509 so as to output a reference voltage in accordance with the instructions from controller 509. The output of comparator 517 is connected to balance switch 511 so as to control its on-off operation.

This electricity accumulating device operates as follows. First, controller 509 calculates the degree of degradation of each capacitor 501. More specifically, controller 509 calculates a capacitance C from the gradient in the change of the voltage across each capacitor 501 when it is charged at a constant current, and also calculates an internal resistance R from the change in the voltage across each capacitor 501 when the charge is suspended. Controller 509 then calculates the differences between the capacitance C and its predetermined degradation limit and between the internal resistance R and its predetermined degradation limit, thereby determining the degree of degradation from the differences. Therefore, the smaller the differences, the greater the degree of degradation.

Next, controller 509 calculates the average of the degree of degradation of all capacitors 501, and determines the balanced voltage of each capacitor 501 in such a manner as to reduce variations in the degree of degradation in all capacitors 501. In the case of a highly degraded capacitor 501, controller 509 determines a balanced voltage that reduces the voltage across the capacitor 501 so as to delay the degradation. Then, controller 509 controls each balanced voltage adjusting portion 503 to make the voltage across each capacitor 501 the balanced voltage.

Thus, the balanced voltages of capacitors 501 are adjusted so as to reduce variations in the degree of degradation in all capacitors 501. This delays the degradation of highly degraded capacitors 501, thereby allowing all capacitors to reach operating limits substantially at the same time. As a result, the electricity accumulating device has a long life. This technique is disclosed in Patent Literature 1.

The above-described conventional electricity accumulating device, however, is required to perform the following complex operations while capacitors 501 are being charged with a constant current. First, the capacitance C and the internal resistance R of each capacitor 501 are calculated. Next, the degree of degradation of each capacitor 501 is calculated from them. Then, the balanced voltage of each capacitor 501 is calculated from the average of the degree of degradation of all capacitors 501 in such a manner as to reduce variations in the degree of degradation in all capacitors 501.

Patent Literature 1: Japanese Patent Unexamined Publication No. 2007-124883

SUMMARY OF THE INVENTION

The present invention provides an electricity accumulating device having capacitors whose life is extended accurately by a simple operation.

The electricity accumulating device of the present invention includes a plurality of capacitors connected in series, a plurality of balanced voltage adjusting portions connected to the capacitors respectively, and a control circuit connected to the balanced voltage adjusting portions. The control circuit performs the following operations: measuring the two voltages ($V1i$ and $V2i$, where "i" is 1 to "n", where "n" represents the number of the capacitors) at different times from each other across each of the capacitors during the non-charge-or-discharge period of the capacitors by using the balanced voltage adjusting portions; calculating the absolute value ($\Delta Vi$) of the difference between the voltages ($V1i$ and $V2i$) across each of the capacitors; measuring a first point of time (t1) at which the voltage (V1$i$) is measured and a second point of time (t2) at which the voltage (V2$i$) is measured; calculating the time difference (Δt) by subtracting the first point of time (t1) from the second point of time (t2); calculating a voltage adjustment range (ΔVb$i$) of each of the capacitors by dividing the absolute value (ΔV$i$) by the time difference (Δt) and multiplying the result by a specified coefficient (A); determining the balanced voltage (Vr$i$) by subtracting the voltage adjustment range (ΔVb$i$) from an initial balanced voltage (Vro); and controlling the balanced voltage adjusting portions to make a voltage (V$i$) across each of the capacitors the balanced voltage (Vr$i$).

According to the electricity accumulating device of the present invention, the control circuit calculates the absolute value (ΔV$i$) of the difference between the two voltages (V1$i$ and V2$i$) measured at different times from each other across each of the capacitors, and determines the balanced voltage (Vr$i$) therefrom while the capacitors are not being charged or discharged. This eliminates the need to calculate the capacitance C or the internal resistance R while the capacitors are being charged at a constant current as in the conventional electricity accumulating devices. This also eliminates the need to control the determination of the balanced voltage from the average of the degree of degradation. As a result, the life of the capacitors can be extended by a simpler operation than in the conventional electricity accumulating devices.

REFERENCE MARKS IN THE DRAWINGS

11 capacitor
13 balanced voltage adjusting portion
15 control circuit
25 temperature sensor

DETAILED DESCRIPTION OF PREFERRED EMBODIMENTS

The preferred embodiments for carrying out the present invention will be described by means of embodiments with reference to accompanied drawings. In the embodiments, the electricity accumulating device is used in a hybrid vehicle.

First Exemplary Embodiment

Figure 1:
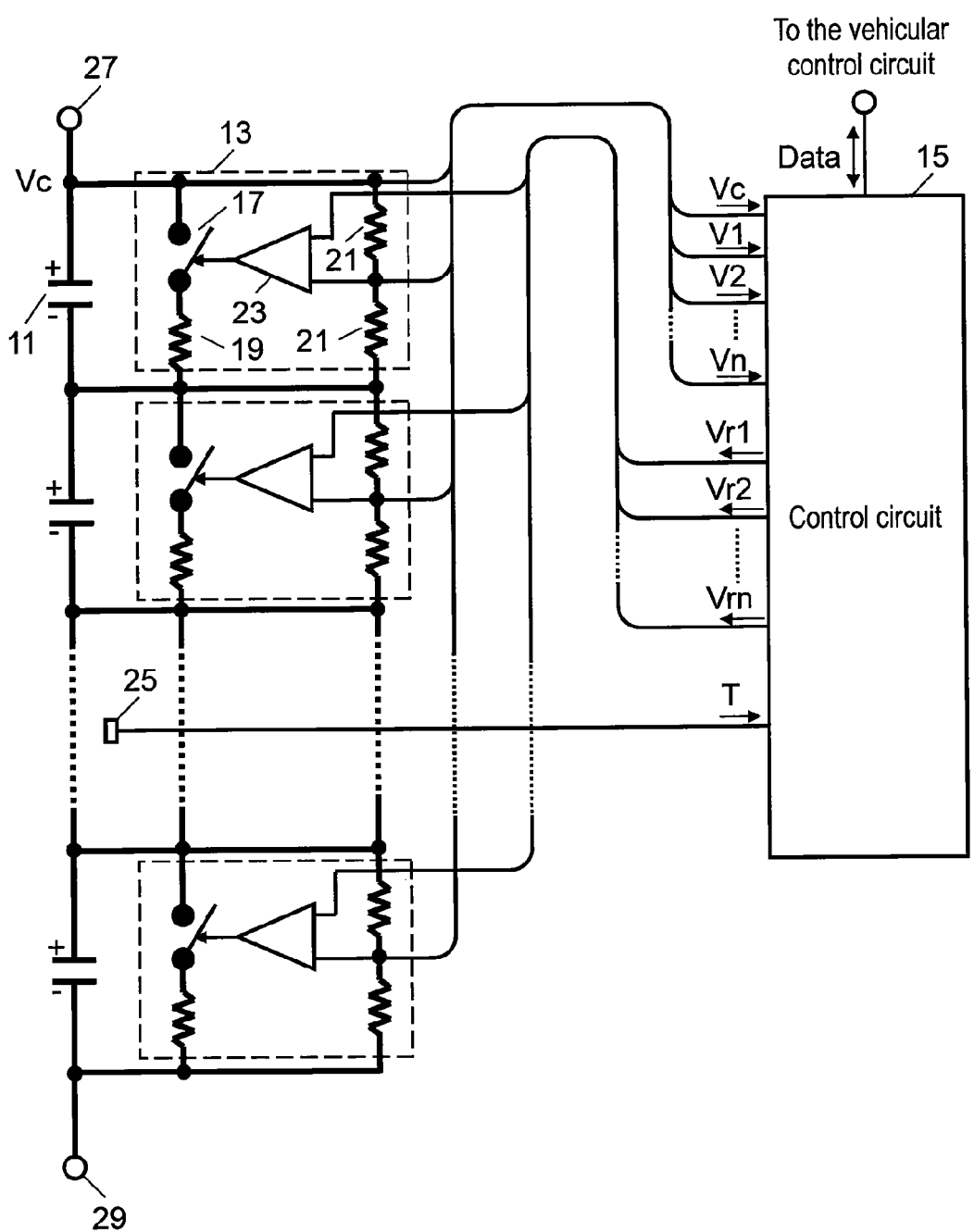
FIG. 1 is a block circuit diagram of an electricity accumulating device according to a first exemplary embodiment of the present invention.

FIG. 1 is a block circuit diagram of an electricity accumulating device according to a first exemplary embodiment of the present invention. As shown in FIG. 1, the electricity accumulating device includes capacitors 11 connected in series. In the drawing, thick lines represent electrical wires, and thin lines represent signal wires. Capacitors 11 in the present first exemplary embodiment are electric double layer capacitors having a large capacitance. Capacitors 11 may alternatively be connected in series-parallel according to the power specification required. In this case, capacitors connected in parallel are treated as one capacitor 11 so as to make them have an equivalent circuit of capacitors 11 shown in FIG. 1. Therefore, the following description is based on the assumption that each capacitor 11 can be either one or a plurality of capacitors connected in parallel. It is possible that the end terminals of series-connected capacitors 11 in the electricity accumulating device of FIG. 1 are connected to the end terminals in other electricity accumulating devices. In such series-parallel connection, each capacitor 11 is connected to the corresponding balanced voltage adjusting portion 13, which will be described later.

Figure 13:
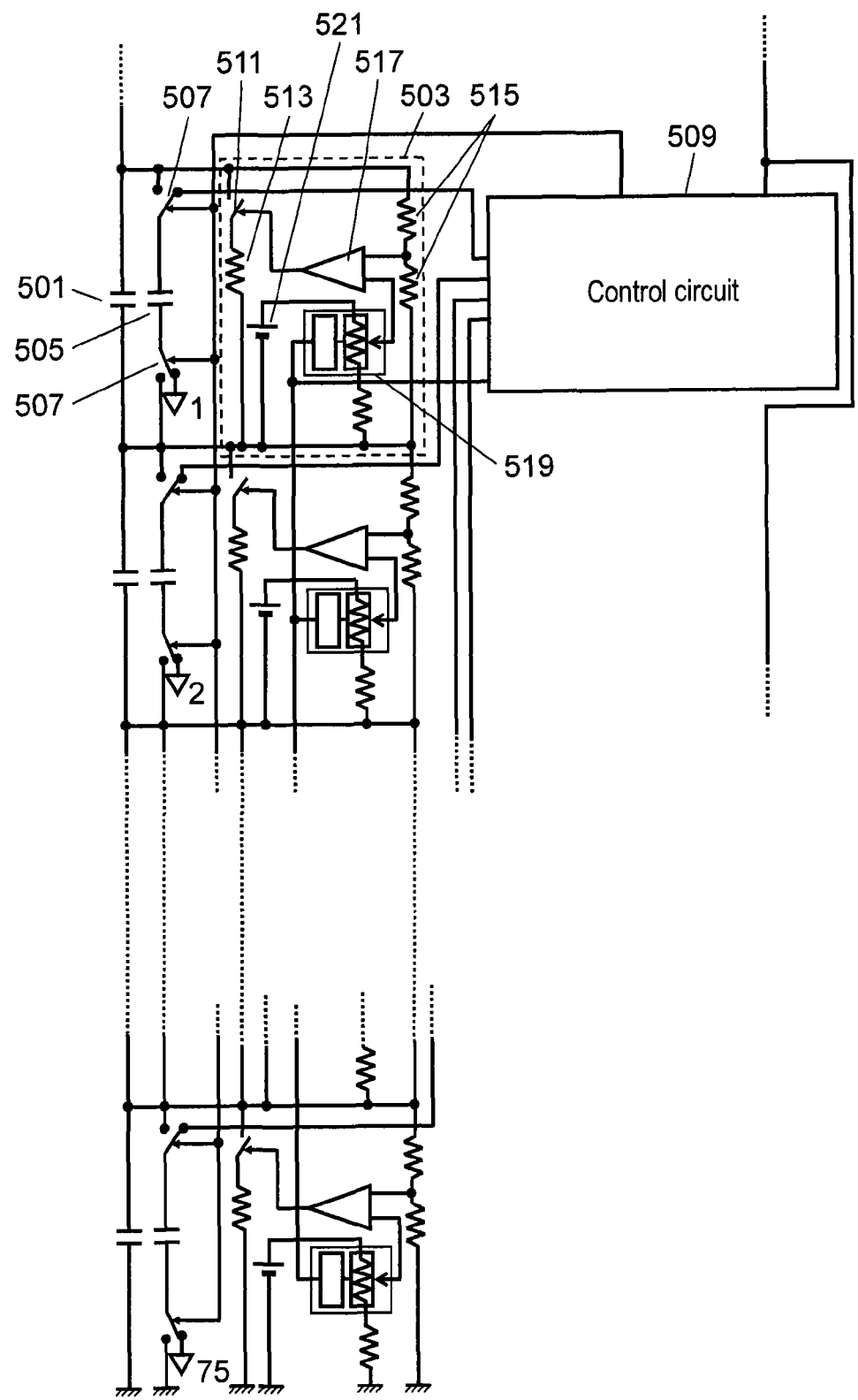
FIG. 13 is a block circuit diagram of a conventional electricity accumulating device.

Capacitors 11 are connected at their both ends to balanced voltage adjusting portions 13. Balanced voltage adjusting portions 13 are connected to control circuit 15, which controls the operation of balanced voltage adjusting portions 13. Control circuit 15 is composed of peripheral circuits and a microcomputer for controlling them. The peripheral circuits have functions of, for example, digital potentiometer 519 and reference supply 521 of the conventional electricity accumulating device shown in FIG. 13. Control circuit 15 also has a function of exchanging data with a vehicular control circuit (not shown) by using a data signal (Data).

The following is a description of the structure of balanced voltage adjusting portions 13. Each balanced voltage adjusting portion 13 includes a series circuit connected to both ends of capacitor 11. The series circuit includes balance switch 17 and balance resistor 19. Balance switch 17 can be externally on-off controlled, and can be, for example, a FET or a transistor. Each balanced voltage adjusting portion 13 includes another series circuit connected to both ends of the corresponding capacitor 11. The series circuit has two partial pressure resistors 21. The connection point of two partial pressure resistors 21 is connected to control circuit 15, and also to one input of comparator 23. Therefore, control circuit 15 can read a voltage Vi (i=1 to n, where n represents the number of capacitors 11 connected in series) across each capacitor 11. The positive electrode of the uppermost capacitor 11 shown in FIG. 1 has the same voltage as a full voltage Vc of all capacitors 11 connected in series. Therefore, control circuit 15 can also read the full voltage Vc via the uppermost balanced voltage adjusting portion 13.

The other input of comparator 23 is connected to control circuit 15, so that comparator 23 can receive a balanced voltage Vri from control circuit 15. The output of comparator 23 is connected to balance switch 17 so as to control the on-off operation of balance switch 17.

The electricity accumulating device includes temperature sensors 25 near capacitors 11. Temperature sensors 25 are thermistors having a large change in resistance with temperature. The outputs of temperature sensors 25 are connected to control circuit 15, so that control circuit 15 can read a temperature T detected by temperature sensor 25.

Positive terminal 27 and negative terminal 29, which are the end terminals of series-connected capacitors 11, are connected to the motor, the generator, the battery, the loads, and other components of the vehicle via charge-discharge circuits. These components are not illustrated in FIG. 1.

The electricity accumulating device having the above-described structure operates as follows.

Figure 2:
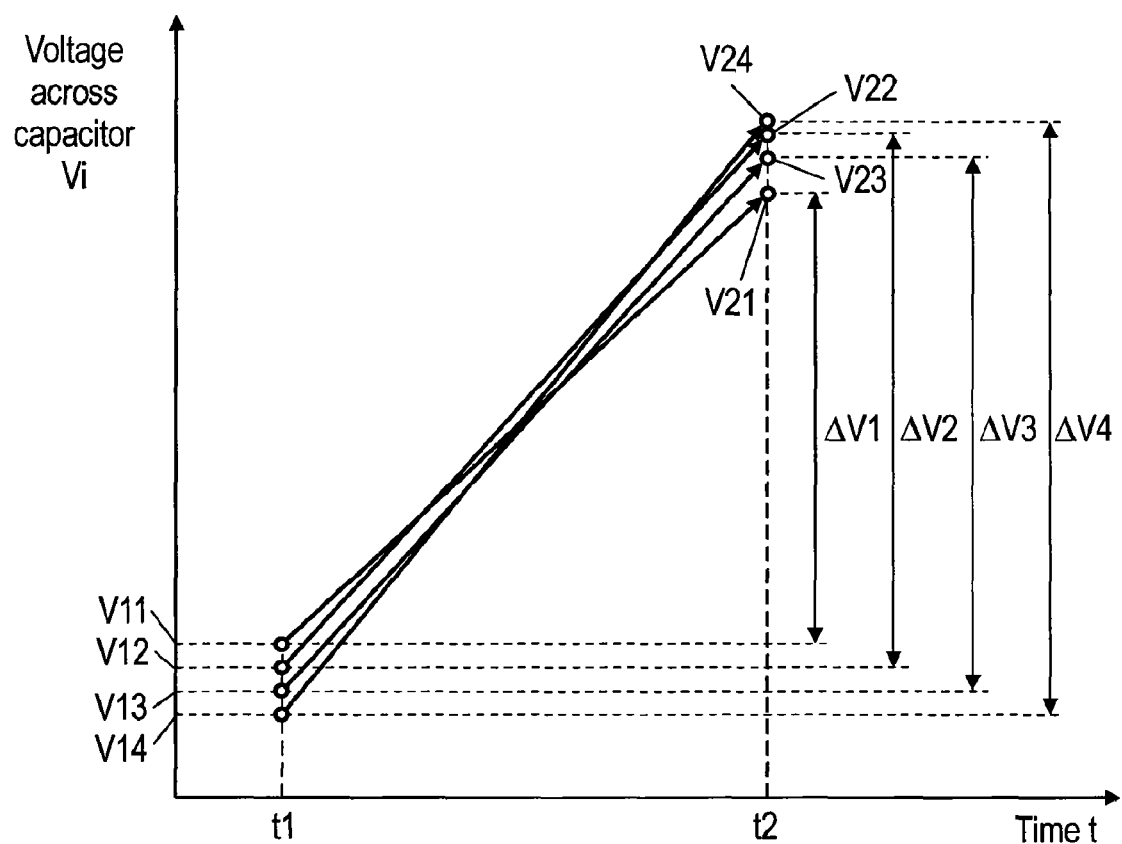
FIG. 2 is a graph showing the change in the voltage across each capacitor from time t1 to time t2 in the electricity accumulating device according to the first exemplary embodiment of the present invention.

FIG. 2 is a graph showing the change in the voltage across each capacitor from time t1 to time t2 in the electricity accumulating device. In FIG. 2, the horizontal axis represents the time "t", and the vertical axis represents the voltage Vi across each capacitor 11. In the case of a hybrid vehicle, several hundred capacitors 11 are connected in series as mentioned above, however, in the following description, only four capacitors 11 are connected in series for easier explanation. Thus, the number "n" of capacitors 11 is 4, and the subscript "i" is in the range of 1 to 4.

First assume that at the time t1, the ignition switch (not shown) of the vehicle is turned on and the vehicle is started. Control circuit 15 recognizes the start of the vehicle when receiving a signal indicating that the ignition switch has been turned on as a data signal (Data) from the vehicular control circuit. Control circuit 15 may alternatively recognize the start of the vehicle by a driving voltage which is supposed to be applied to control circuit 15 when the ignition switch is turned on. Upon recognizing the start of the vehicle, control circuit 15 reads the present voltage V1i (i=1 to 4) across each capacitor 11 sequentially from balanced voltage adjusting portions 13, and stores them in a memory embedded in control circuit 15. At the same time, control circuit 15 stores the time t1 as a first point of time t1 in the memory. This means that the first point of time t1 has been measured. Capacitors 11 have respective voltages V11 to V14 across themselves, which are in a low state due to self-discharge until the time t1 after the use of the vehicle is finished last time. The voltages V11 to V14 are different from each other due to variations in the characteristics and the degree of degradation in all capacitors 11.

The next time the vehicle is in use, capacitors 11 are charged with regenerative electric power whenever the brakes are applied, and the stored electric power is discharged therefrom whenever the vehicle is accelerated. This change with time is not shown in FIG. 2.

Next assume that the use of the vehicle is finished at the time t2. Since the use of the vehicle is generally finished when the brakes are applied and then the vehicle is brought to a halt, capacitors 11 are charged with the regenerative electric power generated at the time of braking. Therefore, at the time t2 of FIG. 2, each capacitor 11 has a voltage V2i (i=1 to 4) across themselves, which is larger than the voltage V1i at the time t1. Control circuit 15 reads voltages V21 to V24 across respective capacitors 11 at the time t2 sequentially from balanced voltage adjusting portions 13, and stores them in the memory. Control circuit 15 also stores the time t2 as a second point of time t2. This means that the second point of time t2 has been measured.

As is obvious from the above description, both the times t1 and t2 are in the non-charge-or-discharge period in which capacitors 11 are not being charged or discharged. This allows the voltages V1i and V2i across each capacitor 11 to be measured in a stable state. The term "non-charge-or-discharge period" is defined as a period in which capacitors 11 are not being aggressively charged or discharged by the charge-discharge circuits (not shown). In other words, the non-charge-or-discharge period includes not only a state in which no current is being supplied to capacitors 11, but also a state in which a slight leakage current is flowing to capacitors 11 although the charge-discharge circuits are not being operated.

The voltage Vi across each capacitor 11 changes with temperature, and therefore, control circuit 15 stores the predetermined temperature dependence of the voltage Vi. Control circuit 15 then corrects the voltages V1i and V2i across each capacitor 11, based on the stored temperature dependence according to the temperature T from temperature sensor 25.

More specifically, control circuit 15 determines the temperature dependence of the voltage Vi across each capacitor 11 when the temperature T is changed after capacitors 11 have been charged to a known voltage at a reference temperature To (for example, 25° C.). Control circuit 15 determines the temperature dependence in every known voltage range (for example, 0.1V) until the known voltage reaches a rated voltage (for example, 2.5V) of capacitors 11. The temperature dependence of the voltage Vi across each capacitor 11 is repeatedly determined until capacitors 11 reach the rated voltage (2.5V) while changing the temperature T. The temperature T can be changed at the following times: when capacitors 11 have been charged first to 0.1V, next to 0.2V, then to 0.3V, and so on at the reference temperature To (25° C.). The temperature dependences thus obtained are previously stored in the memory of control circuit 15.

When the temperature T and a voltage Vi across capacitor 11 are thus obtained, control circuit 15 selects the temperature dependence corresponding to the voltage Vi at the temperature T from among the temperature dependences. Then, control circuit 15 determines the voltage Vi at the reference temperature To, based on the selected temperature dependence. The voltage Vi thus determined becomes a temperature-corrected value.

Therefore, even when the temperatures are different at the times t1 and t2 of FIG. 2, the voltage Vi across capacitor 11 at the temperature T is corrected to the voltage Vi across capacitor 11 at the reference temperature To, thereby improving the accuracy of calculating the balanced voltage Vri, which will be described below. The temperature correction can reduce the speed of the degradation of capacitors 11 (which will be described in detail later) with high accuracy, contributing to the long life of capacitors 11.

The magnitude relation between the voltages V21 to V24 across respective capacitors 11 is not necessarily the same as the magnitude relation between the voltages V11 to V14 across respective capacitors 11, but may be the other way around according to the variations in the characteristics or the degree of degradation in all capacitors 11. More specifically, in FIG. 2, capacitor 11 having the largest voltage V11 across itself at the time t1 has the smallest voltage V21 at the time t2, and capacitor 11 having the smallest voltage V14 across itself at the time t1 has the largest voltage V24 at the time t2. Therefore, in the present first exemplary embodiment, the balanced voltage Vri of each capacitor 11 is determined based on the inclination of each thick arrow shown in FIG. 2, which is obtained from the voltages V1$i$ and V2$i$ measured at the times t1 and t2 across each capacitor 11.

The following is a specific description of how the balanced voltage Vri is determined.

Figure 3:
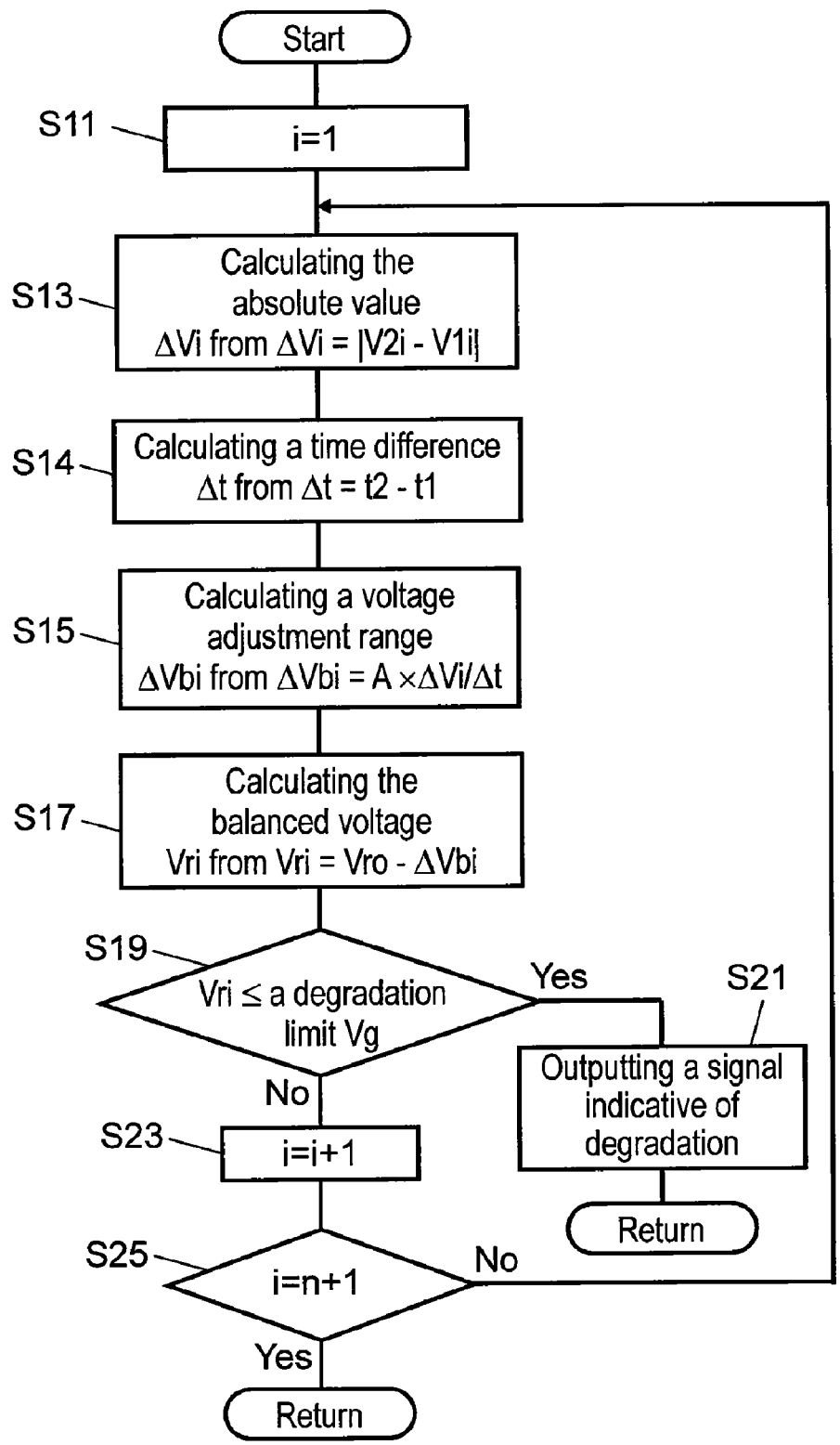
FIG. 3 is a flowchart showing a process for determining the balanced voltage of each capacitor in the electricity accumulating device according to the first exemplary embodiment of the present invention.

FIG. 3 is a flowchart showing a process for determining the balanced voltage of each capacitor in the electricity accumulating device according to the first exemplary embodiment. The flowchart of FIG. 3 is shown as a subroutine because control circuit 15 controls the operation of the electricity accumulating device as a whole by executing different subroutines called from the main routine.

Control circuit 15 executes the subroutine of FIG. 3 at the time t2 when the first and second points of time t1 and t2, and the voltages V1$i$ and V2$i$ across each capacitor 11 are all obtained. First, control circuit 15 assigns 1 to a variable memory "i" embedded therein (step number: S11). The variable memory "i" is defined to have the same meaning as, and is hereinafter referred to as the subscript "i". Step S11 in the flowchart shows "i=1", which is defined to mean that the value on the right-hand side is assigned to the variable on the left-hand side in the following description. Therefore, in S11, "1", which is the value on the right-hand side is assigned to the subscript "i", which is the variable on the left-hand side.

Next, control circuit 15 calculates the absolute value ΔVi of the difference between the voltages V1$i$ and V2$i$ across each capacitor 11 from an equation: ΔVi=|V2$i$−V1$i$| (S13). Then, control circuit 15 calculates a time difference Δt by subtracting the first point of time t1 from the second point of time t2 (S14). In other words, control circuit 15 calculates the time difference Δt from an equation: Δt=t2−t1. Next, control circuit 15 calculates a voltage adjustment range ΔVbi of each capacitor 11 from the absolute value ΔVi, the time difference Δt, and a specified coefficient "A", based on an equation: ΔVbi=A×ΔVi/Δt (S15), where ΔVi/Δt is the inclination of each thick arrow in FIG. 2. Each inclination corresponds to the reciprocal of the capacitance C of each capacitor 11. All capacitors 11 are connected in series and therefore charged with the same current "I". In this case, capacitors 11 store charges having an amount of charge "Q", where Q=C·ΔVi=I·Δt. This equation can be modified into C=I·Δt/ΔVi. Since all capacitors 11 have the same current "I", it is obvious that the reciprocal of the inclination ΔVi/Δt in FIG. 2 is proportional to the capacitance C of each capacitor 11.

Since the capacitance C decreases with the degradation of capacitors 11, higher degraded capacitors 11 have a larger inclination ΔVi/Δt. Therefore, it is obvious that in FIG. 2, capacitor 11 having a subscript "i" of 4 has the largest inclination, and hence, most degraded of all. Thus, the balanced voltage Vri is determined according to the magnitude relation between the inclinations.

In order to determine the balanced voltage Vri, control circuit 15 first determines the voltage adjustment range ΔVbi in S15. The voltage adjustment range ΔVbi indicates how much the voltage should be reduced from an initial balanced voltage Vro set when capacitors 11 are in the initial state with no degradation. The initial balanced voltage Vro is, for example, 2.5V when capacitors 11 have a rated voltage of 2.5V. The initial balanced voltage Vro is calculated by multiplying the inclination by the specified coefficient "A". As a result, higher degraded capacitors 11 having a larger inclination have a larger voltage adjustment range ΔVbi. The specified coefficient "A" is a coefficient used to allow the balanced voltage Vri to be in a normal range in the next step S17. The specified coefficient "A" is experimentally predetermined and stored in the memory.

Next, control circuit 15 calculates the balanced voltage Vri from an equation: Vri=Vro−ΔVbi (S17). As described above, the voltage adjustment range ΔVbi increases with the degradation of capacitors 11. The balanced voltage Vri, on the other hand, decreases with the degradation of capacitors 11 because the initial balanced voltage Vro is a constant. Thus, balanced voltage adjusting portions 13 adjust the voltage Vi across each capacitor 11 to become the balanced voltage Vri, making higher degraded capacitors 11 have a smaller voltage Vi across themselves. As a result, higher degraded capacitors 11 are degraded slower than the other capacitors 11. The specified coefficient "A" is predetermined and multiplied by the inclination in S15 so that the balanced voltage Vri can be prevented from becoming too small or negative in the equation of S17.

Next, control circuit 15 compares the balanced voltage Vri with a degradation limit Vg (S19). The degradation limit Vg, which is also an experimentally predetermined value, represents the balanced voltage Vri when capacitors 11 are degraded to the limit of use. When the balanced voltage Vri becomes equal to or less than the degradation limit Vg (YES in S19), this indicates that the electricity accumulating device cannot be used any more. In this case, control circuit 15 transmits a signal indicative of degradation of the electricity accumulating device as a Data signal to the vehicular control circuit (S21). Upon receiving the Data signal, the vehicular control circuit informs the driver that the electricity accumulating device is in a degraded state and urges him/her to repair it, and at the same time, stops charging the electricity accumulating device. As a result, the electricity accumulating device is not used in a degraded state, thereby providing high reliability. After this, control circuit 15 terminates the subroutine of FIG. 3, and returns to the main routine.

When the balanced voltage Vri is larger than the degradation limit Vg (NO in S19), on the other hand, this indicates that the electricity accumulating device can be continued to be used. In this case, control circuit 15 adds 1 to the subscript "i" and updates the contents of the subscript "i" (S23). Control circuit 15 then determines whether the updated subscript "i" is equal to the value obtained by adding 1 to "n" (n=4) indicating the number of capacitors 11 (S25). When the subscript "i" is determined not to be equal to "n+1" (NO in S25), this indicates that the balanced voltage Vri has not been determined yet for all capacitors 11. Therefore, the process returns to S13 to repeat the subsequent steps.

When the subscript "i" is determined to be equal to "n+1" (YES in S25), on the other hand, this indicates that the balanced voltage Vri has been determined for all capacitors 11. As a result, control circuit 15 terminates the subroutine of FIG. 3 and returns to the main routine.

The above-described subroutine of the flowchart of FIG. 3 is summarized as follows.

Control circuit 15 first measures the first point of time t1 at which the voltage V1$i$ across each capacitor 11 is measured and the second point of time t2 at which the voltage V2$i$ across each capacitor 11 is measured. Control circuit 15 then calculates the time difference Δt by subtracting the first point of time t1 from the second point of time t2. Control circuit 15 then divides the absolute value ΔVi by the time difference Δt and multiplies the result by the specified coefficient "A", thereby calculating the voltage adjustment range ΔVbi of each capacitor 11. Control circuit 15 then subtracts the voltage adjustment range ΔVbi from the initial balanced voltage Vro, thereby determining the balanced voltage Vri. Thus, control circuit 15 determines the balanced voltage Vri of each capacitor 11 according to the absolute value ΔVi.

After this, control circuit 15 outputs the determined balanced voltages Vri to respective balanced voltage adjusting portions 13. Each balanced voltage adjusting portion 13 adjusts its balance switch 17 so that the voltage Vi across the capacitor 11 connected thereto becomes the balanced voltage Vri. In other words, when the voltage Vi across the capacitor 11 is larger than the balanced voltage Vri, comparator 23 turns on balance switch 17. As a result, the capacitor 11 is discharged through balance resistor 19, and the voltage Vi across the capacitor 11 is reduced. Later, when the voltage Vi across the capacitor 11 becomes substantially equal to the balanced voltage Vri, comparator 23 turns off balance switch 17. As a result, the discharge of the capacitor 11 is terminated, allowing the voltage Vi across the capacitor 11 to become the balanced voltage Vri as the target. This reduces the voltage applied to the capacitor 11, thereby reducing the speed of the degradation of the capacitor 11. After this, the voltage Vi across the capacitor 11 gradually decreases due to self-discharge while the vehicle is not in use.

According to the above-described operation, when the use of the vehicle is finished, the voltage Vi (V24 in FIG. 2) across a highly degraded capacitor 11 is reduced and the voltage Vi (V21 in FIG. 2) across a less degraded capacitor 11 remains high. This allows the highly degraded capacitor 11 to be degraded slower than before and the less degraded capacitor 11 to be degraded more rapidly than the other capacitors 11, thereby equalizing the degree of degradation of all capacitors 11. Therefore, it is less likely that the electricity accumulating device is unable to be used because only one capacitor 11 reaches the degradation limit. As a result, the electricity accumulating device has a long life.

The voltages V1$i$ and V2$i$ across each capacitor 11 are measured during the non-charge-or discharge period of capacitors 11. Therefore, the voltages V1$i$ and V2$i$ across each capacitor 11 reflect the influence of the capacitance C of each capacitor 11 indicated as the reciprocal of the inclination of each thick arrow of FIG. 2, but not the influence of the internal resistance R. The voltage Vi across each capacitor 11 reflects the magnitude of the internal resistance R only either immediately after the charge or the discharge of capacitors 11 is started or when the charge or the discharge of capacitors 11 is completed. Thus, in the present first exemplary embodiment, the degree of degradation of all capacitors 11 can be equalized without calculating the internal resistance R, allowing the life of capacitors 11 to be extended by a simple operation.

With the above-described structure and operation, control circuit 15 calculates the absolute value ΔVi of the difference between the voltages V1$i$ and V2$i$ measured at different times from each other across each capacitor 11 during the non-charge-or-discharge period of capacitors 11, and determines the balanced voltage Vri from the absolute value ΔVi. Thus, the life of capacitors 11 in the electricity accumulating device can be extended by a simple operation.

In the present first exemplary embodiment, the first point of time t1 corresponds to the start-up time of the vehicle, and the second point of time t2 corresponds to the time when the use of the vehicle is finished. This ensures that the voltages V1$i$ and V2$i$ across each capacitor 11 are measured while capacitors 11 are not being charged or discharged. The first and second points of time t1 and t2, however, are not limited to the start-up time of the vehicle and the time when the use of the vehicle is finished, respectively. Provided that capacitors 11 are in the non-charge-or-discharge period, the first and second points of time t1 and t2 may correspond to other points of time when the vehicle is in use. In this case, however, it is necessary either to transmit a signal from the vehicular control circuit to control circuit 15 for the purpose of indicating that the charge-discharge circuits of capacitors 11 are not in operation, or to connect current detection circuits in series to the series circuits of capacitors 11.

Second Exemplary Embodiment

Figure 4:
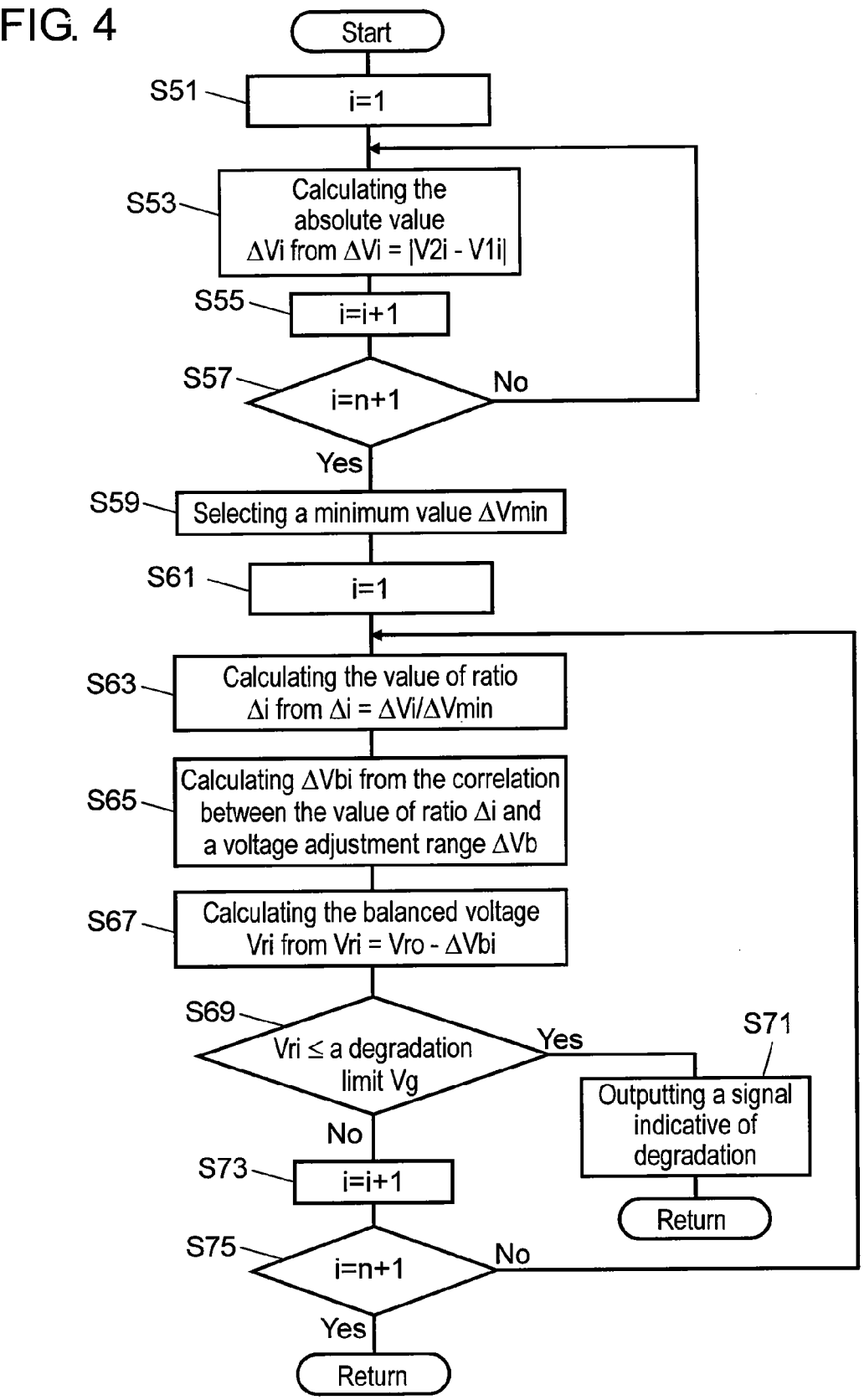
FIG. 4 is a flowchart showing a process for determining the balanced voltage of each capacitor in an electricity accumulating device according to a second exemplary embodiment of the present invention.

FIG. 4 is a flowchart showing a process for determining the balanced voltage of each capacitor in an electricity accumulating device according to a second exemplary embodiment of the present invention. The electricity accumulating device of the present second exemplary embodiment has the same structure as that of the first exemplary embodiment shown in FIG. 1, and hence, the description thereof will be omitted. The present second exemplary embodiment is characterized by its operation, which will be described in detail as follows.

In FIG. 4, when the vehicle is started or in operation, control circuit 15 reads the present voltage V1$i$ across each capacitor 11 at a time t1, which is during the non-charge-or-discharge period of capacitors 11, and stores them in a memory embedded in control circuit 15. In this case, the voltage V1$i$ across each capacitor 11 is subjected to temperature correction in the same manner as in the first exemplary embodiment. The time t1 is not stored in the memory unlike in the first exemplary embodiment.

Next, control circuit 15 reads the present voltage V2$i$ across each capacitor 11 and stores them in the memory embedded therein at a time t2. The time t2, which is later than the time t1, is during the non-charge-or-discharge period of capacitors 11, that is, either when the vehicle is in use or when the use of the vehicle is finished. The voltage V2$i$ across each capacitor 11 is subjected to temperature correction in the same manner as in the first exemplary embodiment. The time t2 is not stored in the memory unlike in the first exemplary embodiment.

When the voltages V1$i$ and V2$i$ across each capacitor 11 are thus obtained, control circuit 15 executes the subroutine of FIG. 4. First, control circuit 15 assigns 1 to the subscript "i" (S51). Next, control circuit 15 calculates the absolute value ΔVi of the difference between the voltages V1$i$ and V2$i$ across each capacitor 11 from an equation: $\Delta Vi = |V2i - V1i|$ (S53). Then, control circuit 15 adds 1 to the subscript "i" and updates it (S55), and determines whether the subscript "i" has reached the value obtained by adding 1 to "n" indicating the number of capacitors 11 (S57). When the subscript "i" is determined not to be equal to "n+1" (NO in S57), the process returns to S53 to repeat the operation to calculate the absolute value ΔVi of the next capacitor 11.

When the subscript "i" is determined to be equal to "n+1" (YES in S57), control circuit 15 selects a minimum value ΔVmin from the absolute values ΔVi (S59). In the case shown in FIG. 2, the ΔV1 becomes the minimum value ΔVmin. Next, control circuit 15 again assigns 1 to the subscript "i" (S61), and calculates the value of ratio Δi between each absolute value ΔVi and the minimum value ΔVmin from an equation: $\Delta i = \Delta Vi/\Delta Vmin$ (S63). The value of ratio Δi thus calculated indicates how much larger is the absolute value ΔVi than the minimum value ΔVmin, and is therefore, 1 or greater. Capacitor 11 corresponding to the minimum value ΔVmin has a voltage ΔVi (ΔV1 in FIG. 2) across itself, which is equal to the minimum value ΔVmin. Therefore, the value of ratio Δi is 1.

As obvious from FIG. 2, capacitor 11 having a value of ratio Δi of 1 has the smallest inclination, and hence, is least degraded. Capacitors 11 having a larger value of ratio Δi are more degraded. In FIG. 2, capacitor 11 having a subscript "i" of 4 is most degraded. Thus, the ratio Δi indicates the degree of degradation of capacitors 11.

Next, control circuit 15 calculates the voltage adjustment range ΔVbi of each capacitor 11 having the subscript "i" from the correlation between the value of ratio Δi and a voltage adjustment range ΔVb (S65). The voltage adjustment range ΔVbi is made to increase with the degradation of capacitors 11 as described in the first exemplary embodiment. Therefore, control circuit 15 stores the experimentally predetermined correlation between the value of ratio Δi and the voltage adjustment range ΔVb in the memory, and determines the voltage adjustment range ΔVbi according to the value of ratio Δi calculated in S63. The correlation between the value of ratio Δi and the voltage adjustment range ΔVb has a positive correlation function, which is expressed in a formula using the least square method. Then, the value of ratio Δi is assigned to the formula so as to calculate the voltage adjustment range ΔVbi of each capacitor 11. This saves the memory, compared with the case in which the correlation is stored as a data table in the memory.

Next, control circuit 15 calculates the balanced voltage Vri from an equation: $Vri = Vro - \Delta Vbi$ (S67). The initial balanced voltage Vro is the same as the rated voltage (2.5V) of capacitors 11 as in the first exemplary embodiment. This means that higher degraded capacitors 11 have a smaller balanced voltage Vri. As a result, highly degraded capacitors 11 are degraded slower than the other capacitors 11, thereby extending the life of capacitors 11 as a whole.

Next, control circuit 15 compares the balanced voltage Vri with a degradation limit Vg (S69). The degradation limit Vg has the same meaning as in the first exemplary embodiment. When the balanced voltage Vri becomes equal to or less than the degradation limit Vg (YES in S69), this indicates that the electricity accumulating device cannot be used any more. In this case, control circuit 15 transmits a signal indicative of degradation of the electricity accumulating device as a Data signal to the vehicular control circuit (S71). Then, control circuit 15 terminates the subroutine of FIG. 3, and returns to the main routine.

When the balanced voltage Vri is larger than the degradation limit Vg (NO in S69), on the other hand, this indicates that the electricity accumulating device can be continued to be used. In this case, control circuit 15 adds 1 to the subscript "i" and updates the contents of the subscript "i" (S73). Control circuit 15 then determines whether the updated subscript "i" is equal to the value obtained by adding 1 to "n" indicating the number of capacitors 11 (S75). When the subscript "i" is determined not to be equal to "n+1" (NO in S75), this indicates that the balanced voltage Vri has not been determined yet for all capacitors 11. Therefore, the process returns to S63 to repeat the subsequent steps. When the subscript "i" is determined to be equal to "n+1" (YES in S75), on the other hand, this indicates that the balanced voltage Vri has been determined for all capacitors 11. As a result, control circuit 15 terminates the subroutine of FIG. 4 and returns to the main routine.

The above-described subroutine of the flowchart of FIG. 4 is summarized as follows.

Control circuit 15 first selects the minimum value ΔVmin from the absolute values ΔVi. Control circuit 15 then calculates the voltage adjustment range ΔVbi of each capacitor 11 from the predetermined correlation between the voltage adjustment range ΔVb and the value of ratio Δi between each absolute value ΔVi and the minimum value ΔVmin. Control circuit 15 then subtracts the voltage adjustment range ΔVbi from the initial balanced voltage Vro, thereby determining the balanced voltage Vri. Thus, control circuit 15 determines the balanced voltage Vri of each capacitor 11 according to the absolute value ΔVi.

After this, in the same manner as in the first exemplary embodiment, balanced voltage adjusting portions 13 allow the voltage Vi across each capacitor 11 to become the balanced voltage Vri thus determined. This reduces the voltage applied to highly degraded capacitors 11 so as to make them degraded more slowly, thereby equalizing the degree of degradation of all capacitors 11. As a result, the electricity accumulating device has a long life.

With the above-described structure and operation, control circuit 15 calculates the absolute value ΔVi of the difference between the voltages V1i and V2i measured at different times from each other across each capacitor 11 during the non-charge-or-discharge period of capacitors 11, and determines the balanced voltage Vri from the ratio Δi between each absolute value ΔVi and the minimum value ΔVmin. This eliminates the need to measure the first and second points of time t1 and t2 unlike in the first exemplary embodiment. Thus, the life of capacitors 11 in the electricity accumulating device can be extended by a simple operation.

In the first and the second exemplary embodiments, control circuit 15 outputs the signal indicative of degradation when the balanced voltage Vri becomes equal to or less than the degradation limit Vg. This signal may alternatively be outputted when the absolute value ΔVi becomes equal to or more than a degradation upper limit ΔVg. The degradation upper limit ΔVg represents the absolute value ΔVi when the electricity accumulating device cannot be used any more, and may be predetermined and stored in the memory in control circuit 15. The absolute value ΔVi increases with the degradation of capacitors 11 as mentioned above. Therefore, it is when the absolute value ΔVi becomes equal to or more than the degradation upper limit ΔVg, as opposed to when the balanced voltage Vri becomes equal to or less than the degradation limit Vg that capacitors 11 are considered to be degraded. This makes it possible to determine the degradation of the electricity accumulating device at the earliest possible time particularly in the second exemplary embodiment. The signal indicative of degradation may alternatively be outputted when these two determinations are both performed and at least one of them is satisfied, thereby improving the accuracy of determining degradation.

In the first and the second exemplary embodiments, the degradation limit Vg or the degradation upper limit ΔVg may be applied in two steps. In the first step, the vehicular control circuit may issue a warning to the driver and also control to limit the charging current. In the second step, the vehicular control circuit may control to stop charging to the electricity accumulating device as well as issuing the warning to the driver. As a result, it is much less likely that the electricity accumulating device is continued to be used after being degraded.

Third Exemplary Embodiment

Figure 5:
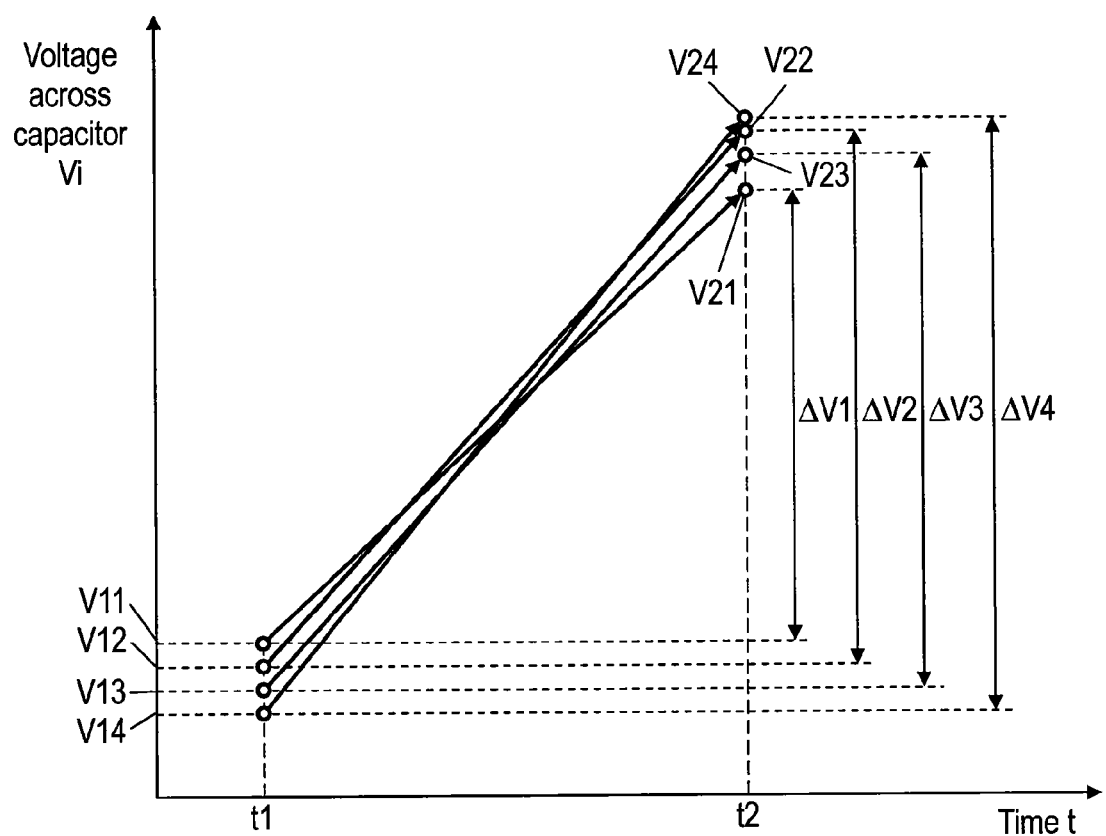
FIG. 5 is a graph showing the change in the voltage across each capacitor from time t1 to time t2 in an electricity accumulating device according to a third exemplary embodiment of the present invention.

FIG. 5 is a graph showing the change in the voltage across each capacitor from time t1 to time t2 in an electricity accumulating device according to a third exemplary embodiment of the present invention.

The electricity accumulating device of the present third exemplary embodiment has the same structure as that of the first exemplary embodiment shown in FIG. 1, and hence, the description thereof will be omitted. The present third exemplary embodiment is characterized by its operation, which will be described in detail as follows. In FIG. 5, the horizontal axis represents the time "t", and the vertical axis represents the voltage Vi across each capacitor 11. In the case of a hybrid vehicle, several hundred capacitors 11 are connected in series as mentioned above, however, in the following description, only four capacitors 11 are connected in series for easier explanation as in the first exemplary embodiment. Thus, the number "n" of capacitors 11 is 4, and the subscript "i" is in the range of 1 to 4.

First assume that at the time t1 in FIG. 5, the ignition switch (not shown) of the vehicle is turned on and the vehicle is started. Control circuit 15 recognizes the start of the vehicle when receiving a signal indicating that the ignition switch has been turned on as a data signal (Data) from the vehicular control circuit. Control circuit 15 may alternatively recognize the start of the vehicle by a driving voltage which is supposed to be applied to control circuit 15 when the ignition switch is turned on.

When the vehicle is started, capacitors 11 have not been charged or discharged. Therefore, control circuit 15 immediately reads the present non-charge-or-discharge-period voltage $V1i$ (i=1 to 4) across each capacitor 11 sequentially from balanced voltage adjusting portions 13, and stores them in the memory embedded therein. At the same time, control circuit 15 stores the time t1 as a first point of time t1 in the memory. This means that the first point of time t1 has been measured. These operations will be described later with FIG. 7. Capacitors 11 have respective non-charge-or-discharge-period voltages V11 to V14 across themselves, which are in a low state due to self-discharge until the time t1 after the use of the vehicle is finished last time. The non-charge-or-discharge-period voltages V11 to V14 are different from each other due to variations in the characteristics and the degree of degradation in all capacitors 11.

The term "non-charge-or-discharge period" is defined as a period in which capacitors 11 are not being aggressively charged or discharged by the charge-discharge circuits (not shown). In other words, the non-charge-or-discharge period includes not only a state in which no current is being supplied to capacitors 11, but also a state in which a slight leakage current is flowing to capacitors 11 although the charge-discharge circuits is not being operated.

The next time the vehicle is in use, capacitors 11 are charged with regenerative electric power whenever the brakes are applied, making the voltage Vi across each capacitor 11 increase with time. The change in the voltage Vi across each capacitor 11 with time is not shown in detail in FIG. 5. While capacitors 11 are continuously being charged after the measurement of the non-charge-or-discharge-period voltage $V1i$ across each capacitor (time t2), control circuit 15 measures a charge-or-discharge-period voltage $V2i$ (i=1 to 4) across each capacitor 11 by using balanced voltage adjusting portions 13, and stores them in the memory. At the same time, control circuit 15 stores the time t2 as a second point of time t2. This means that the second point of time t2 has been measured. These operations will be also described later with FIG. 7. Capacitors 11 are charged with the regenerative electric power generated at the time of braking. Therefore, at the time t2 of FIG. 5, each capacitor 11 has a charge-or-discharge-period voltage $V2i$ across themselves, which is larger than the non-charge-or-discharge-period voltage $V1i$ across themselves at the time t1.

The voltage Vi across each capacitor 11 changes with temperature, and therefore, control circuit 15 stores the predetermined temperature dependence of the voltage Vi. Control circuit 15 then corrects the non-charge-or-discharge-period voltage $V1i$ and the charge-or-discharge-period voltage $V2i$ across each capacitor 11 according to the temperature T from temperature sensor 25.

More specifically, control circuit 15 determines the temperature dependence of the voltage Vi across each capacitor 11 when the temperature T is changed after capacitors 11 have been charged to a known voltage at a reference temperature To (for example, 25° C.). Control circuit 15 determines the temperature dependence in every known voltage range (for example, 0.1V) until the known voltage reaches a rated voltage (for example, 2.5V) of capacitors 11. The temperature dependence of the voltage Vi across each capacitor 11 is repeatedly determined until capacitors 11 reach the rated voltage (2.5V) while changing the temperature T. The temperature T can be changed at the following times: when capacitors 11 have been charged first to 0.1V, next to 0.2V, then to 0.3V, and so on at the reference temperature To (25° C.). The temperature dependences thus obtained are previously stored in the memory of control circuit 15.

When the temperature T and a voltage Vi across capacitor 11 are thus obtained, control circuit 15 selects the temperature dependence corresponding to the voltage Vi at the temperature T from among the temperature dependences. Then, control circuit 15 determines the voltage Vi at the reference temperature To, based on the selected temperature dependence. The voltage Vi thus determined becomes a temperature-corrected value.

Therefore, even when the temperatures are different at the times t1 and t2 of FIG. 5, the voltage Vi across capacitor 11 at the temperature T is corrected to the voltage Vi across capacitor 11 at the reference temperature To, thereby improving the accuracy of calculating of the balanced voltage Vri, which will be described later with FIG. 8. The temperature correction can reduce the speed of the degradation of capacitors 11 (which will be described in detail later) with high accuracy, contributing to the long life of capacitors 11.

The magnitude relation between the charge-or-discharge period voltages V21 to V24 across respective capacitors 11 is not necessarily the same as the magnitude relation between the non-charge-or-discharge-period voltages V11 to V14 across respective capacitors 11, but may be the other way around according to the variations in the characteristics or the degree of degradation in all capacitors 11.

More specifically, in FIG. 5, capacitor 11 having the largest non-charge-or-discharge-period voltage V11 across itself at the time t1 has the smallest charge-or-discharge period voltage V21 at the time t2. Capacitor 11 having the smallest non-charge-or-discharge-period voltage V14 across itself at the time t1 has the largest charge-or-discharge period voltage V24 at the time t2. Therefore, in the present third exemplary embodiment, the balanced voltage Vri of each capacitor 11 is determined based on the inclination of each thick arrow shown in FIG. 5, which is obtained from the voltages $V1i$ and V2 across each capacitor 11 measured at the times t1 and t2.

The following is a description of how the first and second points of time t1 and t2 are determined.

Figure 6:
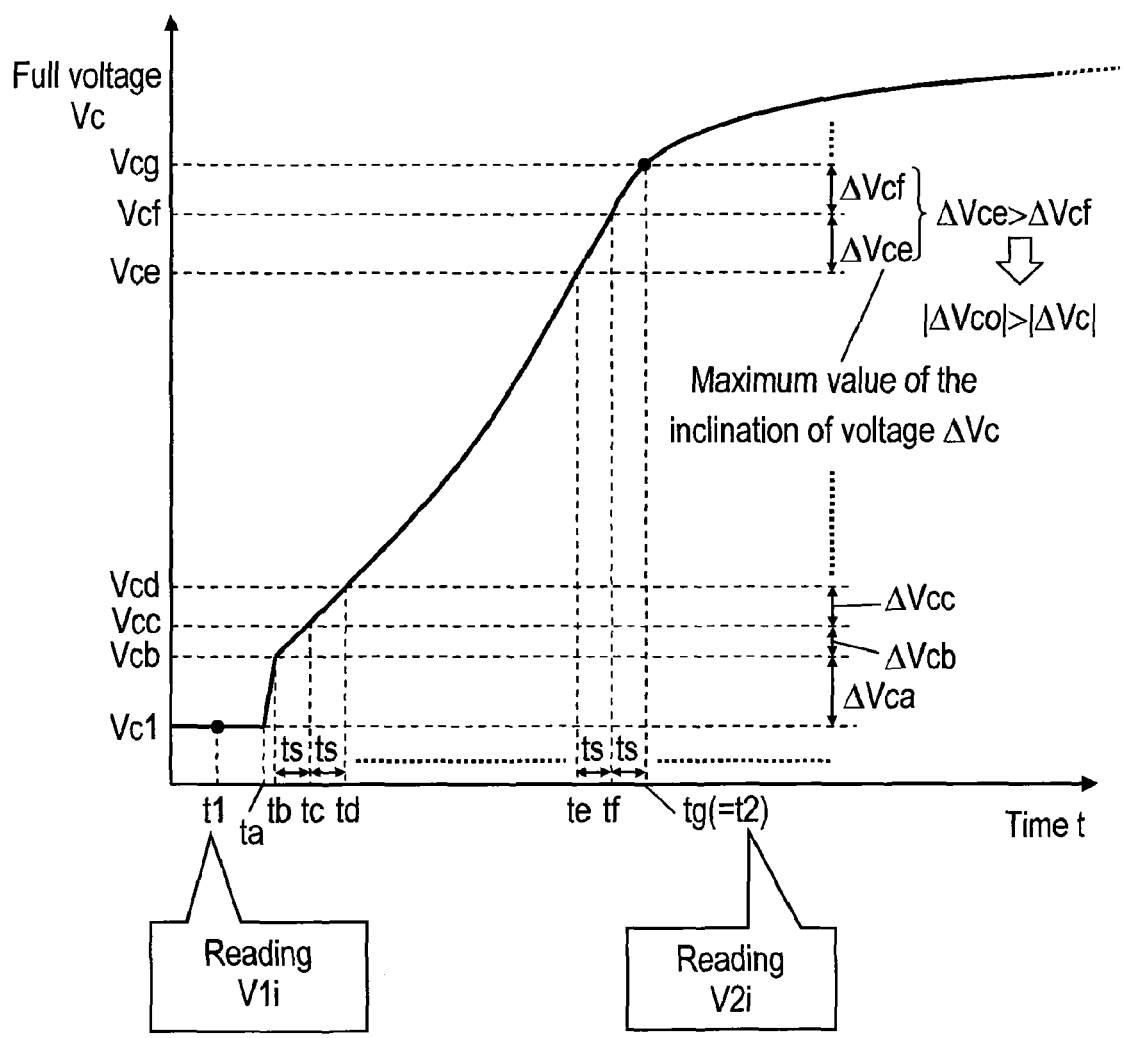
FIG. 6 is a graph showing the change in the characteristics with time of the full voltage of the electricity accumulating device according to the third exemplary embodiment of the present invention.

FIG. 6 is a graph showing the change in the characteristics with time of the full voltage of the electricity accumulating device according to the third exemplary embodiment. In FIG. 6, the horizontal axis represents the time "t" and the vertical axis represents the full voltage Vc of capacitors 11.

The first point of time t1 is set at a point of time when capacitors 11 are in a non-charge-or-discharge state. In FIG. 6, the first point of time t1 is set at a point of time in the non-charge-or-discharge period, that is, when a full voltage Vc1 of capacitors 11 is substantially constant. At this moment, control circuit 15 is reading the non-charge-or-discharge-period voltage V1$i$ across each capacitor 11.

Next assume that at a time "ta", regenerative electric power is generated by braking. As a result, capacitors 11 are charged therewith. Immediately after the start of the charge, an initial voltage rise occurs due to the internal resistance R of all capacitors 11. A voltage rise magnitude $\Delta$Vca can be expressed by "I·R", where "I" is a charging current to capacitors 11. As shown in FIG. 6, the voltage rise occurs rapidly in an extremely short time by a time "tb", and the full voltage Vc increases with time along with the charge of capacitors 11. Control circuit 15 calculates the inclination of voltage $\Delta$Vc of the full voltage Vc every time a predetermined time "ts" passes after the time "tb" when the rapid voltage rise occurs. The predetermined time "ts" is predetermined as a time to calculate the inclination of voltage $\Delta$Vc with high accuracy, and is 0.1 seconds in the present third exemplary embodiment. As apparent from FIG. 6, the inclination of voltage $\Delta$Vc is calculated, for example, by dividing the difference $\Delta$Vcb (=Vcc−Vcb) between a full voltage Vcb at the time "tb" and a full voltage Vcc at a time "tc" by the predetermined time "ts". The time "tc" is obtained by adding the predetermined time "ts" to the time "tb". Since the predetermined time "ts" is constant, the difference $\Delta$Vcb corresponds to the inclination of voltage $\Delta$Vc. Therefore, in the following description, the inclination of voltage $\Delta$Vc means the difference between voltages (for example, $\Delta$Vcb) generated at the predetermined time "ts".

Control circuit 15 calculates the inclination of voltage $\Delta$Vc every predetermined time "ts" even after the time "tc" while capacitors 11 are continuously being charged. More specifically, control circuit 15 calculates a full voltage Vcd at a time "td" when the predetermined time "ts" has passed from the time "tc", and calculates the inclination of voltage $\Delta$Vcc from an equation: $\Delta$Vcc=Vcd−Vcc.

From the time "tb" onward, as capacitors 11 are being charged with the regenerative electric power, the charging current "I" to capacitors 11 increases with time and reaches a maximum current. When the vehicle is slowing down and the braking is being finished, the charging current "I" continues to decrease. On the other hand, the inclination of voltage $\Delta$Vc of the full voltage Vc of capacitors 11 increases with time from the time "tb" onward until the maximum value is reached, and then decreases with time. Thus, as shown in FIG. 6, the inclination of voltage $\Delta$Vcc from the time "tc" to the time "td" is larger than the inclination of voltage $\Delta$Vcb from the time "tb" to the time "tc". The inclination of voltage $\Delta$Vce has a maximum value from a time "te" to a time "tf", and the inclination of voltage $\Delta$Vcf decreases from the time "tf" to a time "tg". Thus, the second point of time t2 represents the time (the time "tg" of FIG. 6) when the inclination of voltage $\Delta$Vcf becomes smaller than the inclination of voltage $\Delta$Vce, that is, when the inclination of voltage $\Delta$Vc ($\Delta$Vcf of FIG. 6) becomes smaller than the previous inclination of voltage $\Delta$Vco ($\Delta$Vce of FIG. 6). At this moment, control circuit 15 is reading the charge-or-discharge-period voltage V2$i$ across each capacitor 11. The difference between the full voltage Vc1 at the first point of time t1 and a full voltage Vcg at the second point of time t2 becomes large enough. As a result, the absolute value $\Delta$Vi of the difference between the non-charge-or-discharge-period voltage V1$i$ at the first point of time t1 and the charge-or-discharge-period voltage V2$i$ at the second point of time t2 across each capacitor 11 is larger than the accuracy of reading the voltages by control circuit 15, thereby making the achieving high accuracy.

The second point of time t2 is determined while capacitors 11 are being charged in FIG. 6, but may alternatively be determined when capacitors 11 enters a discharge state from the non-charge-or-discharge state. In this case, the second point of time t2 is determined in the same manner as in FIG. 6 except that the inclination of each voltage $\Delta$Vc is determined as an absolute value because the full voltage Vc decreases with time due to discharge. This indicates that the time when the inclination of voltage $\Delta$Vc has a smaller absolute value than the previous inclination of voltage $\Delta$Vco can be determined as the second point of time t2.

When the second point of time t2 is set at a point of time during the charge period or the discharge period of capacitors 11, if the inclination of voltage $\Delta$Vc has a different sign from the previous inclination of voltage $\Delta$Vco, it means that capacitors 11 have suddenly changed from the charge state to the discharge state, or from the discharge state to the charge state. As a result, a voltage drop or rise occurs in the former and latter cases, respectively, due to the internal resistance R of all capacitors 11. As the second point of time t2 is set at a later point of time after the voltage drop or rise, the absolute value $\Delta$Vi of the difference at this moment between the charge-or-discharge-period voltage V2$i$ and the non-charge-or-discharge-period voltage V1$i$ across each capacitor 11 decreases. Therefore, it is likely that the absolute value $\Delta$Vi becomes smaller than the accuracy of measuring the voltages and less and less accurate depending on the determined second point of time t2. To avoid this, control circuit 15 determines the second point of time t2 only when the inclination of voltage $\Delta$Vc has the same sign as the previous inclination of voltage $\Delta$Vco.

The above-described operation of determining the second point of time t2 is summarized as follows.

Control circuit 15 calculates the inclination of voltage $\Delta$Vc of the full voltage Vc of series-connected capacitors 11 every predetermined time "ts" after the initial voltage rise or drop. The initial voltage rise or drop is caused by the internal resistance R of all capacitors 11 immediately after the charge or the discharge of capacitors 11 is started. Then, control circuit 15 determines as the second point of time t2 the time when the inclination of voltage $\Delta$Vc has the same sign as and a smaller absolute value than the previous inclination of voltage $\Delta$Vco, and measures the charge-or-discharge-period voltage V2$i$ across each capacitor 11.

Figure 7:
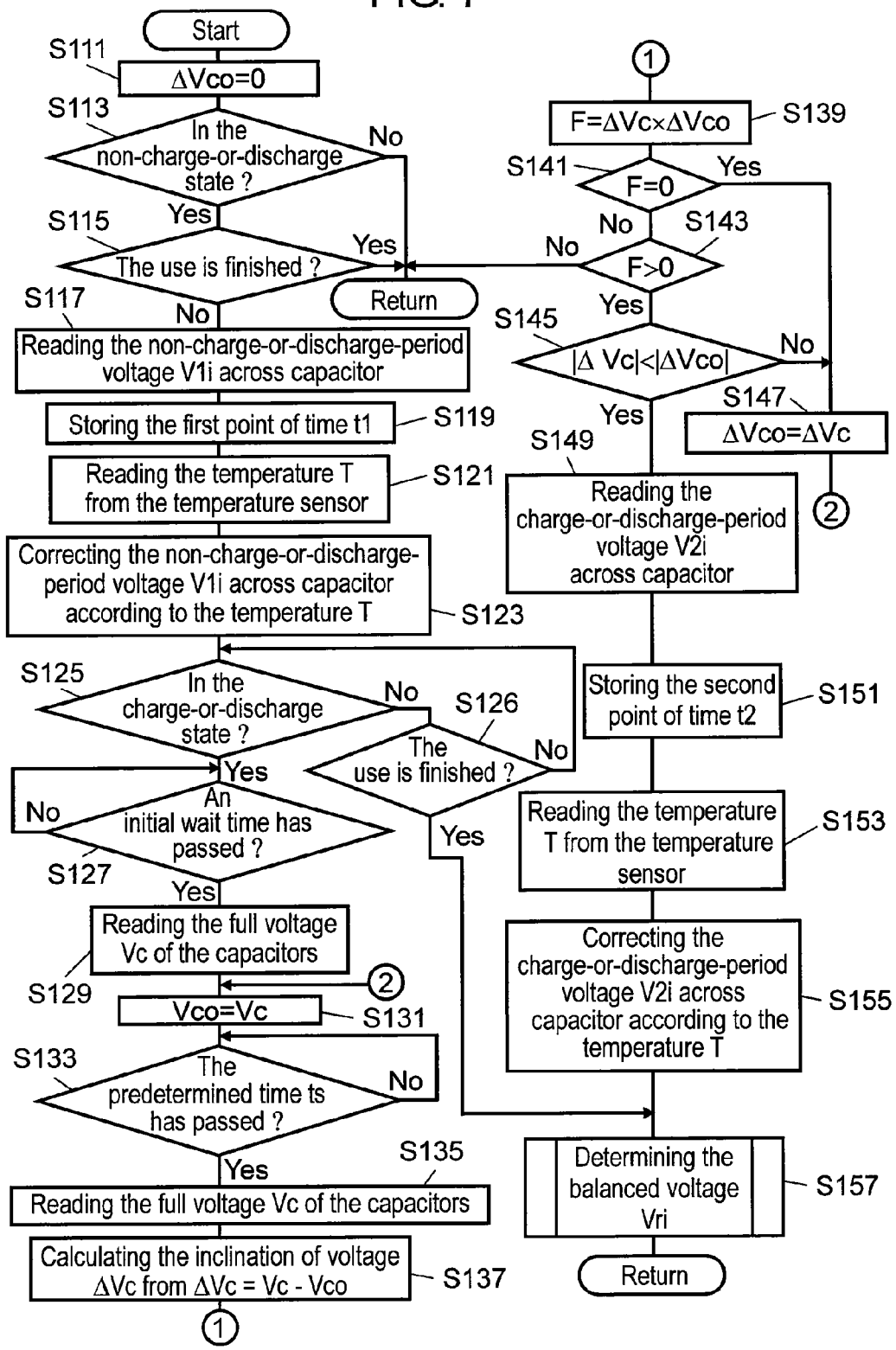
FIG. 7 is a flowchart showing a process for determining a non-charge-or-discharge-period voltage and a charge-or-discharge-period voltage across each capacitor in the electricity accumulating device according to the third exemplary embodiment of the present invention.

The following is a description of the overall operation of determining the balanced voltage Vri. FIG. 7 is a flowchart showing a process for determining a non-charge-or-discharge-period voltage and a charge-or-discharge-period voltage across each capacitor in the electricity accumulating device according to the third exemplary embodiment. The flowcharts of FIGS. 7 and 8 are shown as subroutines because in FIG. 7 control circuit 15 controls the operation of the electricity accumulating device as a whole by executing different subroutines called from the main routine.

Control circuit 15 executes the subroutine of FIG. 7 called from the main routine in order to determine the balanced voltage Vri at regular time intervals (for example, on the order of minutes). Determining the balanced voltage Vri at regular time intervals allows the balanced voltage Vri to reflect the latest state (such as the degree of degradation) of capacitors 11.

When the subroutine of FIG. 7 is started, control circuit 15 first clears the previous inclination of voltage ΔVco (S111). More specifically, control circuit 15 assigns "0" to the previous inclination of voltage ΔVco, which is a memory variable embedded therein. This operation is expressed in an equation: ΔVco=0 shown in S111 of FIG. 7. This is defined to mean that the value (0) on the right-hand side is assigned to the variable on the left-hand side (the previous inclination of voltage ΔVco).

Next, control circuit 15 determines whether capacitors 11 are in the non-charge-or-discharge state (S113). To determine this, control circuit 15 receives the present charge-or-discharge state of capacitors 11 as a data signal (Data) from the vehicular control circuit (not shown). The charge-or-discharge state can be recognized, for example, by receiving the data signal (Data) indicating whether the vehicular control circuit is operating the charge-discharge circuits.

When capacitors 11 are determined not to be in the non-charge-or-discharge state (NO in S113), control circuit 15 terminates the subroutine of FIG. 7 without determining the balanced voltage Vri, and returns to the main routine. Thus, control circuit 15 determines the balanced voltage Vri every time capacitors 11 enter the non-charge-or-discharge state. As a result, the balanced voltage Vri can reflect the latest state of capacitors 11 as mentioned above. Control circuit 15 does not determine the balanced voltage Vri when capacitors 11 are not in the non-charge-or-discharge state because of the following reason.

If the first point of time t1 is set at a point of time in the charge period, in the case of FIG. 6, the first point of time t1 is later than the time "ta". The second point of time t2, on the other hand, is the time "tg" at which capacitors 11 are being charged. Therefore, both the first and second points of time t1 and t2 are while capacitors 11 are being charged. In this case, the absolute value ΔVi of the difference between the voltages Vi across each capacitor 11 at the first and second points of time t1 and t2 shown in FIG. 5 does not include the influence of the voltage rise caused by the internal resistance R of capacitors 11, but reflects only the influence of the capacitance C (corresponding to the inclination of each thick arrow of FIG. 5). As a result, it is impossible to determine the balanced voltage Vri including the influence of the internal resistance R, thereby reducing the accuracy of determining the balanced voltage Vri. To avoid this, in the present third exemplary embodiment, the first point of time t1 is set in a point of time when capacitors 11 are in the non-charge-or-discharge state so that the absolute value ΔVi can include the influence of the internal resistance R. This allows the balanced voltage Vri to include the influence of the internal resistance R, thereby improving its accuracy.

Again in S113, when capacitors 11 are determined to be in the non-charge-or-discharge state (YES in S113), control circuit 15 determines whether the use of the electricity accumulating device is finished (S115). The use of the electricity accumulating device is regarded to be finished when the use of the vehicle is finished. Therefore, control circuit 15 can determine that the use of the electricity accumulating device is finished by reading the state of the ignition key (not shown) transmitted from the vehicular control circuit.

When the use of the electricity accumulating device is finished (YES in S115), it means that it is affirmatively determined in S113 and that the use of the electricity accumulating device is finished with capacitors 11 still in the non-charge-or-discharge state. In other words, the use of the vehicle is finished with capacitors 11 charged with the regenerative electric power generated when the brakes are applied to stop the vehicle. Since capacitors 11 are not aggressively charged or discharged after this, it is impossible to determine the second point of time t2. Therefore, control circuit 15 stops the measurement of the charge-or-discharge-period voltage V2i across each capacitor 11, terminates the subroutine of FIG. 7, and returns to the main routine.

When the use of the electricity accumulating device is determined not to be finished (NO in S115), on the other hand, control circuit 15 reads the non-charge-or-discharge-period voltage V1i across each capacitor 11 from balanced voltage adjusting portions 13 (S117). At the same time, control circuit 15 stores the time as the first point of time t1 (S119).

Next, control circuit 15 reads the temperature T from temperature sensor 25 (S121), and corrects the non-charge-or-discharge-period voltage V1i across each capacitor 11 according to the temperature T (S123). The method for correcting the temperature has been described earlier in detail.

Next, control circuit 15 determines whether capacitors 11 are in the charge-or-discharge state (S125). The operation for the determination is the same as in S113. When capacitors 11 are determined not to be in the charge-or-discharge state (NO in S125), control circuit 15 determines again whether the use of the electricity accumulating device is finished at this moment (S126). When the use is determined to be finished (YES in S126), it means that the ignition key is turned off a little after the vehicle is stopped. In this case, similar to the case of "YES in S115", control circuit 15 terminates the subroutine of FIG. 7 and returns to the main routine. When the use of the electricity accumulating device is determined not to be finished (NO in S126), on the other hand, it is impossible to determine the second point of time t2. Therefore, the process returns to S125 and waits until capacitors 11 enter the charge-or-discharge state.

When capacitors 11 are determined to be in the charge-or-discharge state (YES in S125), control circuit 15 determines whether an initial wait time has passed (S127). The initial wait time is the time between the start and the end of an initial voltage rise or drop due to the internal resistance R of all capacitors 11 immediately after the charge or the discharge of capacitors 11 is started. The initial wait time corresponds to the period between the time "ta" and the time "tb" of FIG. 6. When the initial wait time is determined not to have passed (NO in S127), the process returns to S127 and waits for the initial wait time to pass.

When the initial wait time is determined to have passed (YES in S127), control circuit 15 reads the full voltage Vc of capacitors 11 via the uppermost balanced voltage adjusting portion 13 in FIG. 5 (S129). Then, control circuit 15 assigns the read full voltage Vc to a previous full voltage Vco and updates the previous full voltage Vco (S131).

Next, control circuit 15 determines whether the predetermined time "ts" has passed (S133). The predetermined time "ts" has been described earlier with FIG. 6. When the predetermined time "ts" is determined to have not passed (NO in S133), the process returns to S133 and waits for the predetermined time "ts" to pass. When the predetermined time "ts" is determined to have passed (YES in S133), on the other hand, control circuit 15 again reads the full voltage Vc of capacitors 11 (S135). Then, the inclination of voltage ΔVc described earlier with FIG. 6 is calculated from the full voltage Vc and the previous full voltage Vco, based on an equation: ΔVc=Vc−Vco (S137).

Next, control circuit 15 forms the product F of the obtained inclination of voltage ΔVc and the previously obtained inclination of voltage ΔVco (S139) in order to determine whether these inclinations have the same sign. When they have the same sign, the product F becomes positive; otherwise, it becomes negative. When the product F is "0", it means that the previously obtained inclination of voltage ΔVco has remained "0" after being cleared in S111. In other words, it means that the inclination of voltage ΔVc has been determined for the first time after the execution of the subroutine of FIG. 7. Therefore, when the product F is "0" (YES in S141), there is no previously obtained inclination of voltage ΔVco to be compared with the inclination of voltage ΔVc. Therefore, the process jumps to S147, which will be described later.

When the product "F is not "0" (NO in S141), on the other hand, control circuit 15 determines whether the product F is positive (S143). When the product F is determined to be negative (NO in S143), it means that the inclination of voltage ΔVc and the previously obtained inclination of voltage ΔVco have different signs from each other, indicating that charge and discharge have been suddenly reversed. In this case, control circuit 15 stops the measurement of the charge-or-discharge-period voltage V2$i$ across each capacitor 11, terminates the subroutine of FIG. 7, and returns to the main routine. As a result, the balanced voltage Vri is not updated and remains to have the same value. Control circuit 15 executes the subroutine of FIG. 7 called from the main routine at regular time intervals as mentioned above. Therefore, control circuit 15 can perform the operation of determining the balanced voltage Vri the next time capacitors 11 enter the non-charge-or-discharge state.

When the product F is determined to be positive (YES in S143), on the other hand, it means that the inclination of voltage ΔVc and the previously obtained inclination of voltage ΔVco have the same sign. In this case, control circuit 15 compares the absolute value of the inclination of voltage ΔVc with that of the previously obtained inclination of voltage ΔVco (S145). When the absolute value of the inclination of voltage ΔVc is determined to be equal to or more than that of the previously obtained inclination of voltage ΔVco (NO in S145), the inclination of voltage ΔVc is increasing as shown from the time "tb" to the time "te" in FIG. 6. Therefore, it is still impossible to determine the second point of time t2. In this case, control circuit 15 assigns the inclination of voltage ΔVc to the previously obtained inclination of voltage ΔVco and updates it (S147). The process returns to S131 so as to repeat the operation of determining the inclination of voltage ΔVc after the predetermined time "ts" has passed.

When the absolute value of the inclination of voltage ΔVc is smaller than that of the previously obtained inclination of voltage ΔVco (YES in S145), the inclination of voltage ΔVc corresponds to the state between the time "te" and the time "tg" of FIG. 6. In this case, control circuit 15 reads the charge-or-discharge-period voltage V2$i$ across each capacitor 11 via balanced voltage adjusting portions 13 (S149). At the same time, control circuit 15 stores the time as the second point of time t2 (S151). Next, control circuit 15 reads the temperature T from temperature sensor 25 (S153), and corrects the charge-or-discharge-period voltage V2$i$ across each capacitor 11 according to the temperature T (S155). The method for correcting the temperature has been described earlier in detail.

Through the above-described operation, the first and second points of time t1 and t2, and the non-charge-or-discharge-period voltage V1$i$ and the charge-or-discharge-period voltage V2$i$ across each capacitor 11 are obtained. Therefore, control circuit 15 executes the subroutine of FIG. 8 to determine the balanced voltage Vri (S157). The following description is based on FIG. 8.

Figure 8:
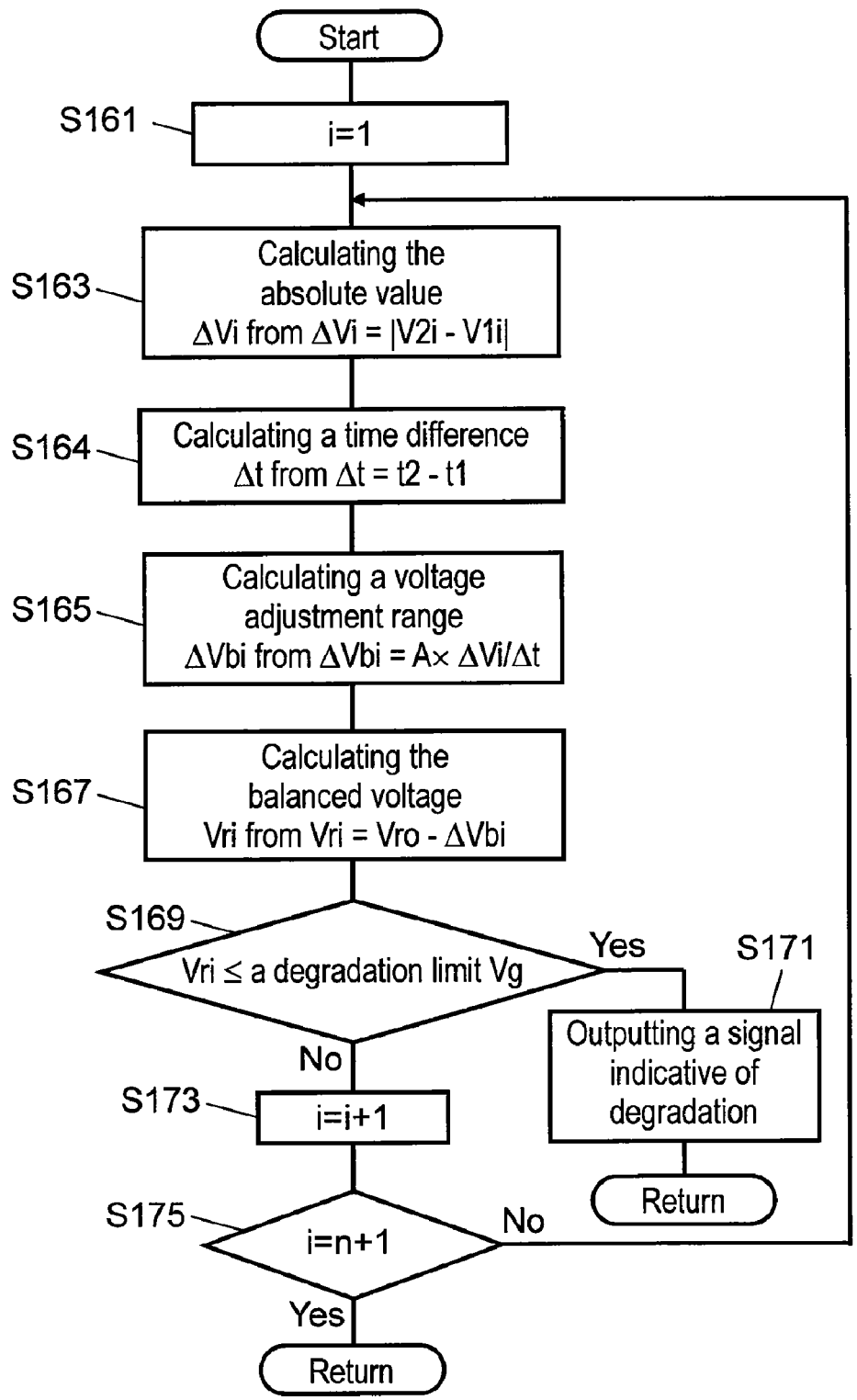
FIG. 8 is a flowchart showing a process for determining the balanced voltage of each capacitor in the electricity accumulating device according to the third exemplary embodiment of the present invention.

FIG. 8 is a flowchart showing a process for determining the balanced voltage of each capacitor in the electricity accumulating device according to the third exemplary embodiment. In FIG. 8, control circuit 15 assigns 1 to the variable memory "i" embedded therein (S161). The variable memory "i" is defined to have the same meaning as, and is hereinafter referred to as the subscript "i".

Next, control circuit 15 calculates the absolute value ΔVi of the difference between the non-charge-or-discharge-period voltage V1$i$ and the charge-or-discharge-period voltage V2$i$ across each capacitor 11 from an equation: $\Delta Vi = |V2i - V1i|$ (S163). Then, control circuit 15 calculates a time difference Δt by subtracting the first point of time t1 from the second point of time t2 (S164). In other words, control circuit 15 calculates the time difference Δt from an equation: $\Delta t = t2 - t1$. Next, control circuit 15 calculates a voltage adjustment range ΔVbi of each capacitor 11 from the absolute value ΔVi, the time difference Δt, and a specified coefficient "A", based on an equation: $\Delta Vbi = A \times \Delta Vi / \Delta t$ (S165), where ΔVi/Δt is the inclination of each thick arrow in FIG. 5. Each inclination corresponds to the reciprocal of the capacitance C of each capacitor 11. All capacitors 11 are connected in series and therefore charged with the same charging current "I". In this case, capacitors 11 store charges having an amount of charge "Q", where $Q = C \cdot \Delta Vi = I \cdot \Delta t$. This equation can be modified into $C = I \cdot \Delta t / \Delta Vi$. Since all capacitors 11 have the same charging current "I", it is obvious that the reciprocal of the inclination ΔVi/Δt in FIG. 5 is proportional to the capacitance C of each capacitor 11.

The capacitance C decreases and an internal resistance Ri of each capacitor 11 increases with the degradation of capacitors 11. Therefore, higher degraded capacitors 11 have a larger voltage rise magnitude ΔVca due to the internal resistance R immediately after the charge of capacitors 11 is started in FIG. 6. The internal resistance R is the sum of the internal resistances Ri of all capacitors 11, and hence, the internal resistance Ri increases with the degradation of capacitors 11. Therefore, in FIG. 5, the absolute value ΔVi is expressed as the sum of a voltage rise caused by the internal resistance Ri of each capacitor 11 and a voltage rise with time due to the charge of each capacitor 11. The inclination ΔVi/Δt reflects the internal resistance Ri and the capacitance C of each capacitor 11, and higher degraded capacitors 11 have a larger inclination ΔVi/Δt. In FIG. 5, capacitor 11 having a subscript "i" of 4 has the largest inclination, and hence, most degraded of all. Thus, the balanced voltage Vri is determined according to the magnitude relation between the inclinations.

In order to determine the balanced voltage Vri, control circuit 15 first determines the voltage adjustment range ΔVbi in S165. The voltage adjustment range ΔVbi indicates how much the voltage should be reduced from an initial balanced voltage Vro set when capacitors 11 are in the initial state with no degradation. The initial balanced voltage Vro is, for example, 2.5V when capacitors 11 have a rated voltage of 2.5V. The initial balanced voltage Vro is calculated by multiplying the inclination by the specified coefficient "A". As a result, higher degraded capacitors 11 having a larger inclination have a larger voltage adjustment range ΔVbi. The specified coefficient "A" is a coefficient used to allow the balanced voltage Vri to be in a normal range in the next step S167. The specified coefficient "A" is experimentally predetermined and stored in the memory.

Next, control circuit 15 calculates the balanced voltage Vri from an equation: $Vri = Vro - \Delta Vbi$ (S167). As described above, the voltage adjustment range ΔVbi increases with the degradation of capacitors 11. The balanced voltage Vri, on the other hand, decreases with the degradation of capacitors 11 because the initial balanced voltage Vro is a constant. Thus, balanced voltage adjusting portions 13 adjust the voltage Vi across each capacitor 11 to become the balanced voltage Vri, making higher degraded capacitors 11 have a smaller voltage Vi across themselves. As the result, higher degraded capacitors 11 are degraded slower than the other capacitors 11, thereby extending the life of capacitors 11 as a whole. The specified coefficient "A" is predetermined and multiplied by the inclination in S165 so that the balanced voltage Vri can be prevented from becoming too small or negative in the equation of S167.

Next, control circuit 15 compares the balanced voltage Vri with a degradation limit Vg (S169). The degradation limit Vg, which is also an experimentally predetermined value, represents the balanced voltage Vri when capacitors 11 are degraded to the limit of use. When the balanced voltage Vri becomes equal to or less than the degradation limit Vg (YES in S169), this indicates that the electricity accumulating device cannot be used any more. In this case, control circuit 15 transmits a signal indicative of degradation of the electricity accumulating device as a Data signal to the vehicular control circuit (S171). Upon receiving the Data signal, the vehicular control circuit informs the driver that the electricity accumulating device is in a degraded state and urges him/her to repair it, and at the same time, inhibits the driver from using the electricity accumulating device. As a result, the electricity accumulating device is not used in a degraded state, thereby providing high reliability. After this, control circuit 15 terminates the subroutine of FIG. 8, and returns to the subroutine of FIG. 7. After executing S157 (the subroutine of FIG. 8) in the subroutine of FIG. 7, control circuit 15 returns to the main routine.

When the balanced voltage Vri is larger than the degradation limit Vg (NO in S169), on the other hand, this indicates that the electricity accumulating device can be continued to be used. In this case, control circuit 15 adds 1 to the subscript "i" and updates the contents of the subscript "i" (S173). Control circuit 15 then determines whether the updated subscript "i" is equal to the value obtained by adding 1 to "n" (n=4) indicating the number of capacitors 11 (S175). When the subscript "i" is determined not to be equal to "n+1" (NO in S175), this indicates that the balanced voltage Vri has not been determined yet for all capacitors 11. Therefore, the process returns to S163 to repeat the subsequent steps.

When the subscript "i" is determined to be equal to "n+1" (YES in S175), on the other hand, this indicates that the balanced voltage Vri has been determined for all capacitors 11. As a result, control circuit 15 terminates the subroutine of FIG. 8 and returns to the subroutine of FIG. 7. After executing S157 (the subroutine of FIG. 8) in the subroutine of FIG. 7, control circuit 15 returns to the main routine.

The above-described subroutine of the flowchart of FIG. 8 is summarized as follows.

Control circuit 15 first measures the first point of time t1 at which the non-charge-or-discharge-period voltage V1$i$ across each capacitor 11 is measured and the second point of time t2 at which the charge-or-discharge-period voltage V2$i$ across each capacitor 11 is measured. Control circuit 15 then calculates the time difference $\Delta$t by subtracting the first point of time t1 from the second point of time t2. Control circuit 15 then divides the absolute value $\Delta$Vi by the time difference $\Delta$t and multiplies the result by the specified coefficient "A", thereby calculating the voltage adjustment range $\Delta$Vbi of each capacitor 11. Control circuit 15 then subtracts the voltage adjustment range $\Delta$Vbi from the initial balanced voltage Vro, thereby determining the balanced voltage Vri. Thus, control circuit 15 determines the balanced voltage Vri of each capacitor 11 according to the absolute value $\Delta$Vi.

While the vehicle is in use, control circuit 15 executes the subroutine of FIG. 7 called from the main routine at regular time intervals. Therefore, when the conditions to determine the balanced voltage Vri are satisfied, the balanced voltage Vri is continued to be updated. Later, when the use of the vehicle is finished, control circuit 15 outputs each latest balanced voltage Vri to the corresponding balanced voltage adjusting portion 13. Thus, each balanced voltage adjusting portion 13 adjusts its balance switch 17 so that the voltage Vi across the capacitor 11 connected thereto becomes the balanced voltage Vri. In other words, when the voltage Vi across each capacitor 11 is larger than the balanced voltage Vri, comparator 23 turns on balance switch 17. As a result, the capacitor 11 is discharged through balance resistor 19, and the voltage Vi across the capacitor 11 is reduced. Later, when the voltage Vi across the capacitor 11 becomes•substantially equal to the balanced voltage Vri, comparator 23 turns off balance switch 17. As a result, the discharge of the capacitor 11 is terminated, allowing the voltage Vi across the capacitor 11 to become the balanced voltage Vri as the target. This reduces the voltage applied to the capacitor 11, thereby reducing the speed of the degradation of the capacitor 11. After this, the voltage Vi across the capacitor 11 gradually decreases due to self-discharge while the vehicle is not in use.

According to the above-described operation, when the use of the vehicle is finished, the voltage Vi (V21 in FIG. 5) across a highly degraded capacitor 11 is reduced and the voltage Vi (V21 in FIG. 5) across a less degraded capacitor 11 remains high. This allows the highly degraded capacitor 11 to be degraded slower than before and the less degraded capacitor 11 to be degraded more rapidly than the other capacitors 11, thereby equalizing the degree of degradation of all capacitors 11. Therefore, it is less likely that the electricity accumulating device is unable to be used because only one capacitor 11 reaches the degradation limit. As a result, the electricity accumulating device has a long life.

With the above-described structure and operation, the non-charge-or-discharge-period voltage V1$i$ across each capacitor 11 is measured in the non-charge-or-discharge period, and the charge-or-discharge-period voltage V2$i$ across each capacitor 11 is measured during the charge-or-discharge period of capacitors 11. Then, the absolute value $\Delta$Vi of the difference between the voltages V1$i$ and V2$i$ is calculated, and the balanced voltage Vri is determined therefrom. Thus, the life of capacitors 11 in the electricity accumulating device can be extended accurately by a very simple operation.

In the present third exemplary embodiment, the balanced voltage Vri is determined when capacitors 11 are in the charge state, but may alternatively be determined when capacitors 11 are in the discharge state. In either case, however, it is necessary that the first point of time t1 is set in the non-charge-or-discharge period, and the second point of time t2 is set in the charge-or-discharge period.

The reason for this is as follows. Assume that the first point of time t1 is set in the charge period, and the second point of time t2, which is later than the first point of time t1, is set in the non-charge period. In this case, a voltage drop occurs due to the internal resistance Ri of each capacitor 11 when the charging is stopped and capacitors 11 enter the non-charge state. As a result, the voltage Vi across each capacitor 11, which increases until the charging is stopped starts to decrease, thereby reducing the absolute value $\Delta$Vi as much as the voltage drop. When becomes too small, the absolute value $\Delta$Vi has an influence on the accuracy of measuring the voltages, thereby reducing the accuracy of the balanced voltage Vri determined based on the absolute value $\Delta$Vi. In addition, a drop in the voltage Vi across each capacitor 11 caused when charging is stopped may be larger than a rise in the voltage Vi across each capacitor 11 generated by charging, depending on the charging time and the size of the internal resistance Ri of each capacitor 11 determined by the degree of degradation. As a result, the inclination $\Delta Vi/\Delta t$ may become negative even in the charge period. When the magnitude relation between the inclinations $\Delta Vi/\Delta t$ varies according to the charge state or the degradation state, the balanced voltage Vri cannot be determined correctly. This is the reason that the first point of time t1 is set in the non-charge period, and the second point of time t2 is set in the charge period. As a result, the inclination $\Delta Vi/\Delta t$ is obtained according to the sum of the voltage rise when charging is started and the rise in the voltage Vi across each capacitor 11 due to the charging. This allows the accurate determination of the balanced voltage Vri reflecting the influence of the charge state and the degradation state. The accurate determination of the balanced voltage Vri can be performed in the same manner in the discharge period.

Fourth Exemplary Embodiment

Figure 9:
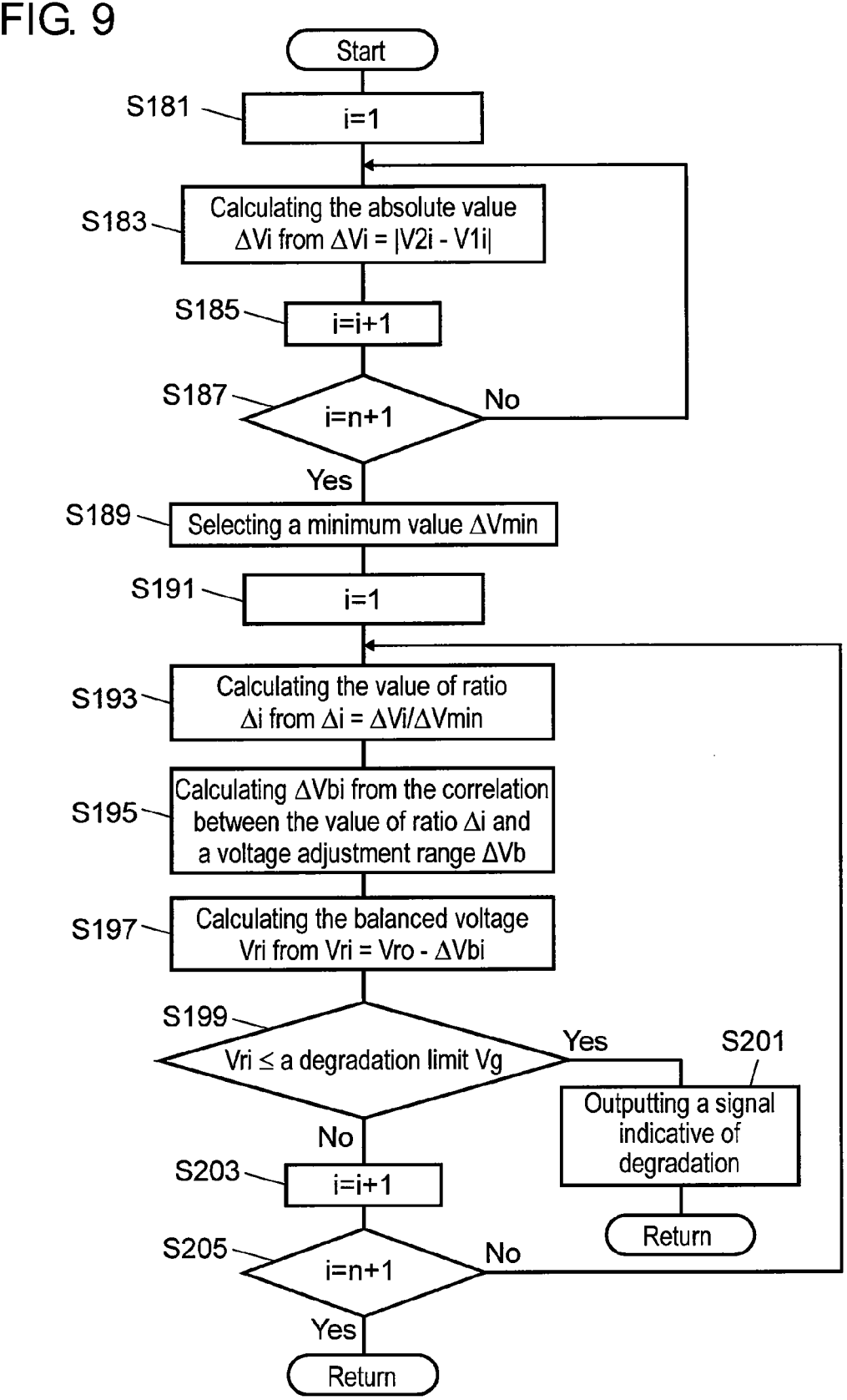
FIG. 9 is a flowchart showing a process for determining the balanced voltage of each capacitor in an electricity accumulating device according to a fourth exemplary embodiment of the present invention.

FIG. 9 is a flowchart showing a process for determining the balanced voltage of each capacitor in an electricity accumulating device according to a fourth exemplary embodiment of the present invention. The electricity accumulating device of the present fourth exemplary embodiment has the same structure as that of the first exemplary embodiment shown in FIG. 1, and hence, the description thereof will be omitted. The present fourth exemplary embodiment is characterized by its operation, which will be described in detail as follows.

The operation in the present fourth exemplary embodiment shown in FIG. 7 is basically the same as in the third exemplary embodiment. The present fourth exemplary embodiment does not include S119 and S151 because it does not use the first and second points of time t1 and t2, so that its control becomes easier. The present fourth exemplary embodiment differs from the third exemplary embodiment in the subroutine of determining the balanced voltage Vri, which will be described later with reference to FIG. 9.

When the non-charge-or-discharge-period voltage V1$i$ and the charge-or-discharge-period voltage V2$i$ across each capacitor 11 are obtained by the execution of the subroutine of FIG. 7, control circuit 15 performs S157 of FIG. 7 so as to execute the subroutine of FIG. 9. First, control circuit 15 assigns 1 to the subscript "i" (S181). Next, control circuit 15 calculates the absolute value $\Delta Vi$ of the difference between the non-charge-or-discharge-period voltage V1$i$ and the charge-or-discharge-period voltage V2$i$ across each capacitor 11 from an equation: $\Delta Vi=|V2i-V1i|$ (S183). Then, control circuit 15 adds 1 to the subscript "i" and updates it (S185), and determines whether the subscript "i" has reached the value obtained by adding 1 to "n" indicating the number of capacitors 11 (S187). When the subscript "i" is determined not to be equal to "n+1" (NO in S187), the process returns to S183 to repeat the operation to calculate the absolute value $\Delta Vi$ of the next capacitor 11.

When the subscript "i" is determined to be equal to "n+1" (YES in S187), control circuit 15 selects a minimum value $\Delta Vmin$ from the absolute values $\Delta Vi$ (S189). In the case shown in FIG. 5, the $\Delta V1$ becomes the minimum value $\Delta Vmin$. Next, control circuit 15 again assigns 1 to the subscript "i" (S191), and calculates the value of ratio $\Delta i$ between each absolute value $\Delta Vi$ and the minimum value $\Delta Vmin$ from an equation: $\Delta i=\Delta Vi/\Delta Vmin$ (S193). The value of ratio $\Delta i$ thus calculated indicates how much larger is the absolute value $\Delta Vi$ than the minimum value $\Delta Vmin$, and is therefore, 1 or greater. Capacitor 11 corresponding to the minimum value $\Delta Vmin$ has a voltage $\Delta Vi$ ($\Delta V1$ in FIG. 5) across itself, which is equal to the minimum value $\Delta Vmin$. Therefore, the value of ratio $\Delta i$ is 1.

As obvious from FIG. 5, capacitor 11 having a value of ratio $\Delta i$ of 1 has the smallest inclination, and hence, is least degraded. Capacitors 11 having a larger value of ratio $\Delta i$ are more degraded. In FIG. 5, capacitor 11 having a subscript "i" of 4 is most degraded. Thus, the value of ratio $\Delta i$ indicates the degree of degradation of capacitors 11.

Next, control circuit 15 calculates the voltage adjustment range $\Delta Vbi$ of each capacitor 11 having the subscript "i" from the correlation between the value of ratio $\Delta i$ and a voltage adjustment range $\Delta Vb$ (S195). The voltage adjustment range $\Delta Vbi$ is made to increase with the degradation of capacitors 11 as described in the third exemplary embodiment. Therefore, control circuit 15 stores the experimentally predetermined correlation between the value of ratio $\Delta i$ and the voltage adjustment range $\Delta Vb$ in the memory, and determines the voltage adjustment range $\Delta Vbi$ according to the value of ratio $\Delta i$ calculated in S193. The correlation between the value of ratio $\Delta i$ and the voltage adjustment range $\Delta Vb$ has a positive correlation function, which is expressed in a formula using the least square method. Then, the value of ratio $\Delta i$ is assigned to the formula so as to calculate the voltage adjustment range $\Delta Vbi$ of each capacitor 11. This saves the memory, compared with the case in which the correlation is stored as a data table in the memory.

Next, control circuit 15 calculates the balanced voltage Vri from an equation: Vri=Vro−$\Delta Vbi$ (S197). The initial balanced voltage Vro is the same as the rated voltage (2.5V) of capacitors 11 as in the third exemplary embodiment. This means that higher degraded capacitors 11 have a smaller balanced voltage Vri. As a result, highly degraded capacitors 11 are degraded slower than the other capacitors 11, thereby extending the life of capacitors 11 as a whole.

Next, control circuit 15 compares the balanced voltage Vri with a degradation limit Vg (S199). The degradation limit Vg has the same meaning as in the third exemplary embodiment. When the balanced voltage Vri becomes equal to or less than the degradation limit Vg (YES in S199), this indicates that the electricity accumulating device cannot be used any more. In this case, control circuit 15 transmits a signal indicative of degradation of the electricity accumulating device as a Data signal to the vehicular control circuit (S201). Then, control circuit 15 terminates the subroutine of FIG. 9, and returns to the subroutine of FIG. 7.

When the balanced voltage Vri is larger than the degradation limit Vg (NO in S199), on the other hand, this indicates that the electricity accumulating device can be continued to be used. In this case, control circuit 15 adds 1 to the subscript "i" and updates the contents of the subscript "i" (S203). Control circuit 15 then determines whether the updated subscript "i" is equal to the value obtained by adding 1 to "n" indicating the number of capacitors 11 (S205). When the subscript "i" is determined not to be equal to "n+1" (NO in S205), this indicates that the balanced voltage Vri has not been determined yet for all capacitors 11. Therefore, the process returns to S193 to repeat the subsequent steps. When the subscript "i" is determined to be equal to "n+1" (YES in S205), on the other hand, this indicates that the balanced voltage Vri has been determined for all capacitors 11. As a result, control circuit 15 terminates the subroutine of FIG. 9 and returns to the subroutine of FIG. 7.

The above-described subroutine of the flowchart of FIG. 9 is summarized as follows.

Control circuit 15 first selects the minimum value $\Delta Vmin$ from the absolute values $\Delta Vi$. Control circuit 15 then calculates the voltage adjustment range $\Delta Vbi$ of each capacitor 11 from the predetermined correlation between the voltage adjustment range $\Delta Vb$ and the value of ratio $\Delta i$ between each absolute value $\Delta Vi$ and the minimum value $\Delta Vmin$. Control circuit 15 then subtracts the voltage adjustment range $\Delta Vbi$ from the initial balanced voltage Vro, thereby determining the balanced voltage Vri. Thus, control circuit 15 determines the balanced voltage Vri of each capacitor 11 according to the absolute value ΔVi. As described in the third exemplary embodiment, the absolute value ΔVi reflects the internal resistance Ri and the capacitance C of each capacitor 11. Therefore, in the present fourth exemplary embodiment, the balanced voltage Vri can be determined based on the absolute value ΔVi, thereby improving the accuracy.

After this, in the same manner as in the third exemplary embodiment, balanced voltage adjusting portions 13 allow the voltage Vi across each capacitor 11 to become the balanced voltage Vri thus determined when the use of the vehicle is finished. This reduces the voltage applied to highly degraded capacitors 11 so as to make them degraded more slowly, thereby equalizing the degree of degradation of all capacitors 11. As a result, the electricity accumulating device has a long life.

With the above-described structure and operation, the non-charge-or-discharge-period voltage V1$i$ across each capacitor 11 is measured during the non-charge-or-discharge period, and the charge-or-discharge-period voltage V2$i$ across each capacitor 11 is measured during the charge-or-discharge period of capacitors 11. Then, the absolute value ΔVi of the difference between the voltages V1$i$ and V2$i$ is calculated, and the balanced voltage Vri is determined from the value of ratio Δi between each absolute value ΔVi and the minimum value ΔVmin. This eliminates the need to measure the times t1 and t2 unlike in the third exemplary embodiment. Thus, the life of capacitors 11 in the electricity accumulating device can be extended accurately by a simple operation.

In the third and the fourth exemplary embodiments, the charge-or-discharge-period voltage V2$i$ across each capacitor 11 is measured when the inclination of voltage ΔVc has the same sign as and a smaller absolute value than the previously obtained inclination of voltage ΔVco. Alternatively, the inclination of voltage ΔVc may be replaced by a charge-discharge current "I" supplied to capacitors 11, and the previously obtained inclination of voltage ΔVco may be replaced by a previous charge-discharge current Io. The charge-discharge current "I" may be obtained by, for example, being received by control circuit 15 as a data signal Data via the vehicular control circuit from the current detection circuits (not shown) embedded in the charge-discharge circuits. The charge-discharge current "I" may also be obtained by providing current detection circuits in series to all capacitors 11 and being detected by the current detection circuits. In this case, in the flowchart of FIG. 7, the inclination of voltage ΔVc is replaced by the charge-discharge current "I", and the previously obtained inclination of voltage ΔVco is replaced by the previous charge-discharge current Io. Furthermore, the charge-discharge current "I" is read in S137, and the steps related to the full voltage Vc and the previous full voltage Vco (S129, S131, and S135) are deleted. Although the current detection circuits are required, the operation can be more simplified than in FIG. 7, and hence, the balanced voltage Vri can be determined more quickly. When the charge-discharge current "I" and the previous charge-discharge current To have different signs from each other, the measurement of the charge-or-discharge-period voltage V2$i$ across each capacitor 11 is stopped so as not to update the balanced voltage Vri. The balanced voltage Vri can be determined the next time capacitors 11 enter the non-charge-or-discharge state.

Fifth Exemplary Embodiment

Figure 10:
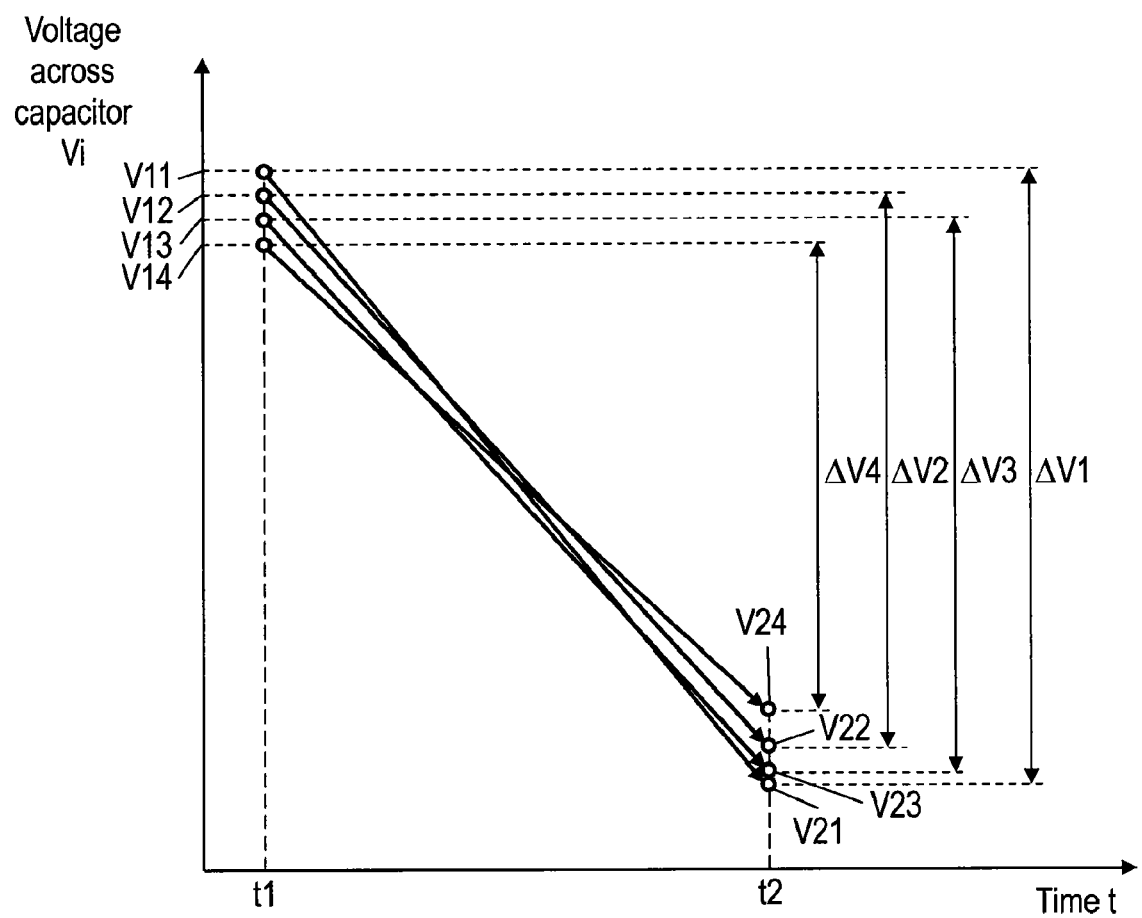
FIG. 10 is a graph showing the change in the voltage across each capacitor from time t1 to time t2 in an electricity accumulating device according to a fifth exemplary embodiment of the present invention.

FIG. 10 is a graph showing the change in the voltage across each capacitor from time t1 to time t2 in an electricity accumulating device according to a fifth exemplary embodiment of the present invention. The electricity accumulating device of the present fifth exemplary embodiment has the same structure as that of the first exemplary embodiment shown in FIG. 1, and hence, the description thereof will be omitted. The present fifth exemplary embodiment is characterized by its operation, which will be described in detail as follows. In FIG. 10, the horizontal axis represents the time "t", and the vertical axis represents the voltage Vi across each capacitor 11. In the case of a hybrid vehicle, several hundred capacitors 11 are connected in series as mentioned above, however, in the following description, only four capacitors 11 are connected in series for easier explanation as in the first exemplary embodiment. Thus, the number "n" of capacitors 11 is 4, and the subscript "i" is in the range of 1 to 4.

Assume that at the time t1 in FIG. 10, the use of the vehicle is finished and the ignition switch (not shown) is turn off. Control circuit 15 recognizes the finish of the use of the vehicle when receiving a signal indicating that the ignition switch has been turned off as a data signal Data from the vehicular control circuit. At this moment, capacitors 11 have a large end-of-use-time voltage V1$i$ (i=1 to 4) across themselves because capacitors 11 have been charged with the regenerative electric power generated at the time of braking. As shown in FIG. 10, however, the end-of-use-time voltages V11 to V14 are different from each other due to variations in the characteristics and the degree of degradation in all capacitors 11. The time t1 is when the use of capacitors 11 is finished and during the non-charge-or-discharge period of capacitors 11. Therefore, control circuit 15 reads the present end-of-use-time voltage V1$i$ (i=1 to 4) across each capacitor 11 sequentially from balanced voltage adjusting portions 13, and stores them in the memory embedded therein. At the same time, control circuit 15 stores the time t1 as a first point of time t1. This means that the first point of time t1 has been measured.

After this, when the vehicle is not in use, capacitors 11 self-discharge according to respective insulation resistance values Rzi, making the voltage Vi across each capacitor 11 decrease with time. The insulation resistance value Rz and the capacitance C decrease with the degradation of capacitors 11. The voltage Vi across a capacitor 11 (having the subscript "i") causing self-discharge is expressed by Vi=Voi/exp(t/(Rzi·Ci)) where "t" is the time passed until the voltage Vi across the capacitor 11 is determined from a voltage Voi across the capacitor 11 at a certain point of time. Since the insulation resistance value Rzi and capacitance Ci decrease with the degradation of capacitors 11 as described above, the term of exp(t/(Rzi·Ci)) increases. From this, it is obvious that the voltage Vi across the capacitor 11 decreases. Thus, the voltage Vi across the capacitor 11 becomes smaller than the voltage Voi across the capacitor 11 at the certain point of time as degradation proceeds, thereby increasing the inclination |Voi−Vi|/t which is due to the change in the voltage Vi with time. Therefore, capacitor 11 having a subscript "i" of 1, which has a large absolute value (corresponds to |Voi−Vi|/t) of the inclination of a thick arrow in FIG. 10 is most degraded of all. The change in the voltage Vi across each capacitor 11 with time is not shown in detail in FIG. 10

Assume that at the time t2, the vehicle is started next time. Control circuit 15 recognizes the start of the vehicle when informed that the ignition switch is turned on from the vehicular control circuit. Control circuit 15 may alternatively recognize the start of the vehicle by a driving voltage which is supposed to be applied to control circuit 15 when the ignition switch is turned on.

Since the vehicle is in the stopped state immediately after it is started, no regenerative electric power is generated, and hence, capacitors 11 are not charged. When the vehicle is thus started next time during the non-charge-or-discharge period of capacitors 11, control circuit 15 measures a start-up-time voltage V2$i$ ($i$=1 to 4) across each capacitor 11 by using balanced voltage adjusting portions 13, and stores them in the memory. At the same time, control circuit 15 stores the time t2 as a second point of time t2. This means that the second point of time t2 has been measured.

As is obvious from the above description, both the times t1 and t2 are in the non-charge-or-discharge period in which capacitors 11 are not being charged or discharged. This allows the voltages V1$i$ and V2$i$ across each capacitor 11 to be measured in a stable state. The term non-charge-or-discharge period" is defined as a period in which capacitors 11 are not being aggressively charged or discharged by the charge-discharge circuits (not shown). In other words, the non-charge-or-discharge period includes not only a state in which no current is being supplied to capacitors 11, but also a state in which a slight leakage current is flowing to capacitors 11 although the charge-discharge circuits are not being operated.

The voltage Vi across each capacitor 11 changes with temperature, and therefore, control circuit 15 stores the predetermined temperature dependence of the voltage Vi. Control circuit 15 then corrects the end-of-use-time voltage V1$i$ and the start-up-time voltage V2$i$ across each capacitor 11, based on the stored temperature dependence according to the temperature T from temperature sensor 25.

More specifically, control circuit 15 determines the temperature dependence of the voltage Vi across each capacitor 11 when the temperature T is changed after capacitors 11 have been charged to a known voltage at a reference temperature To (for example, 25° C.). Control circuit 15 determines the temperature dependence in every known voltage range (for example, 0.1V) until the known voltage reaches a rated voltage (for example, 2.5V) of capacitors 11. The temperature dependence of the voltage Vi across each capacitor 11 is repeatedly determined until capacitors 11 reach the rated voltage (2.5V) while changing the temperature T. The temperature T can be changed at the following times: when capacitors 11 have been charged first to 0.1V, next to 0.2V, then to 0.3V, and so on at the reference temperature To (25° C.). The temperature dependences thus obtained are previously stored in the memory of control circuit 15.

When the temperature T and a voltage Vi across capacitor 11 are thus obtained, control circuit 15 selects the temperature dependence corresponding to the voltage Vi at the temperature T from among the temperature dependences. Then, control circuit 15 determines the voltage Vi at the reference temperature To, based on the selected temperature dependence. The voltage Vi thus determined becomes a temperature-corrected value.

Therefore, even when the temperatures are different at the times t1 and t2 of FIG. 10, the voltage Vi across capacitor 11 at the temperature T is corrected to the voltage Vi across capacitor 11 at the reference temperature To, thereby improving the accuracy of calculating the balanced voltage Vri, which will be described later with FIG. 11. The temperature correction can reduce the speed of the degradation of capacitors 11 (which will be described in detail later) with high accuracy, contributing to the long life of capacitors 11.

The magnitude relation between the start-up-time voltages V21 to V24 across respective capacitors 11 is not necessarily the same as the magnitude relation between the end-of-use-time voltages V11 to V14 across respective capacitors 11, but may be the other way around according to the variations in the characteristics or the degree of degradation in all capacitors 11.

More specifically, in FIG. 10, capacitor 11 having the largest end-of-use-time voltage V11 across itself at the time t1 has the smallest start-up-time voltage V21 at the time t2, and capacitor 11 having the smallest end-of-use-time voltage V14 across itself at the time t1 has the largest start-up-time voltage V24 at the time t2. The reason for this is that as described above, the inclination Vi/t increases as the insulation resistance value Rz and the capacitance C decrease with the degradation of capacitors 11. Thus, it is obvious that capacitor 11 having a subscript "i" of 1 is degraded of all, and capacitor 11 having a subscript "i" of 4 is least degraded of all. Therefore, the present fifth exemplary embodiment focuses attention on the fact that the inclination of each thick arrow of FIG. 10 obtained from the end-of-use-time voltage V1$i$ at the first point of time t1 and the start-up-time voltage V2$i$ at the second point of time t2 reflects the insulation resistance value Rz and the capacitance C. As a result, the balanced voltage Vri of each capacitor 11 is determined based on the above-described inclination.

The following is a specific description of how the balanced voltage Vri is determined.

Figure 11:
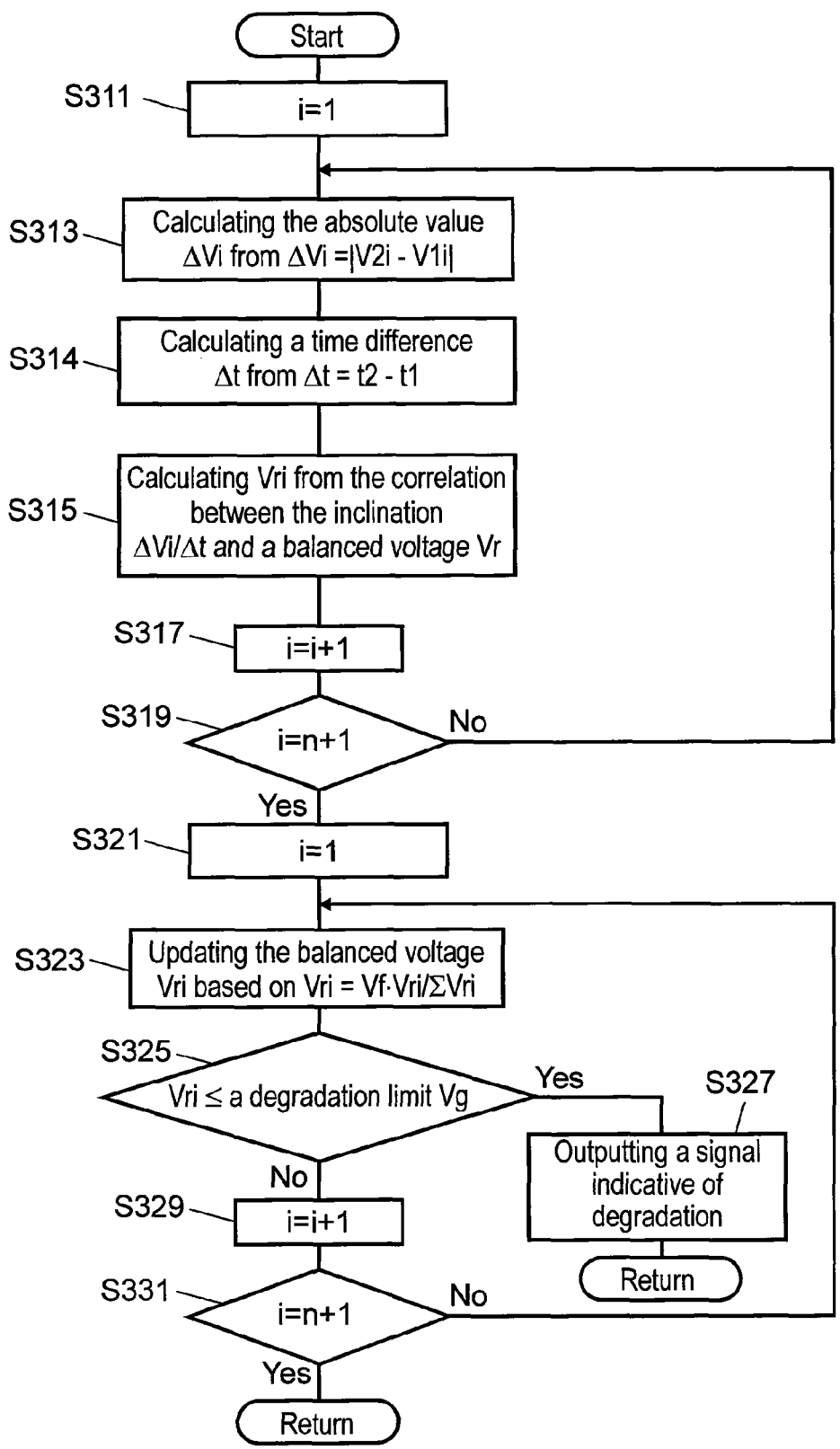
FIG. 11 is a flowchart showing a process for determining the balanced voltage of each capacitor in the electricity accumulating device according to the fifth exemplary embodiment of the present invention.

FIG. 11 is a flowchart showing a process for determining the balanced voltage of each capacitor in the electricity accumulating device according to the fifth exemplary embodiment. The flowchart of FIG. 11 is shown as a subroutine because control circuit 15 controls the operation of the electricity accumulating device as a whole by executing different subroutines called from the main routine.

Control circuit 15 executes the subroutine of FIG. 11 at the time t2 when the first and second points of time t1 and t2, the end-of-use-time voltage V1$i$ and the start-up-time voltage V2$i$ across each capacitor 11 are all obtained. First, control circuit 15 assigns 1 to a variable memory "i" embedded therein (S311). The variable memory "i" is defined to have the same meaning as, and is hereinafter referred to as the subscript "i". S311 in the flowchart shows "i=1", which is defined to mean that the value on the right-hand side is assigned to the variable on the left-hand side in the following description. Therefore, in S311, "1", which is the value on the right-hand side is assigned to the subscript "i", which is the variable on the left-hand side.

Next, control circuit 15 calculates the absolute value ΔVi of the difference between the end-of-use-time voltage V1$i$ and the start-up-time voltage V2$i$ across each capacitor 11 from an equation: ΔVi=|V2$i$–V1$i$| (S313). Then, control circuit 15 calculates a time difference Δt by subtracting the first point of time t1 from the second point of time t2 (S314). In other words, control circuit 15 calculates the time difference Δt from an equation: Δt=t2–t1.

Next, control circuit 15 calculates an inclination ΔVi/Δt obtained by dividing the absolute value ΔVi by the time difference Δt. The ΔVi corresponds to ΔV1 to ΔV4 of FIG. 10, and the inclination ΔVi/Δt corresponds to the inclination of each thick arrow of FIG. 10. Then, control circuit 15 calculates the balanced voltage Vri of each capacitor 11 from the predetermined correlation between the inclination ΔVi/Δt and a balanced voltage Vr (S315).

The balanced voltage Vr is a value determined according to the degree of degradation of capacitors 11. For example, when bland-new capacitors 11 have a rated voltage of 2.5V, the balanced voltage Vr is set to 2.5V. When capacitors 11 are degraded, the balanced voltage Vri is decreased so as to reduce the voltage applied to capacitors 11, thereby reducing the speed of the degradation of capacitors 11. Therefore, the balanced voltage Vr is made smaller than 2.5V according to an increase in the inclination ΔVi/Δt due to the degradation of capacitors 11. The inclination $\Delta Vi/\Delta t$ and the balanced voltage Vr have a nonlinear correlation.

The reason for this is as follows.

As described above, the insulation resistance value Rz and capacitance C reduce with the degradation of capacitors 11. The degree of their reduction, however, cannot be expressed by a simple function that is uniquely determined with respect to the degree of degradation. When brand-new capacitors 11 are degraded to some degree, the insulation resistance value Rz is reduced. After this, however, the degradation of capacitors 11 does not proceed so much even when the insulation resistance value Rz continues to decrease. When the insulation resistance value Rz is much more reduced, the degradation of capacitors 11 proceeds at an accelerated rate, and then again slows down. In addition to this property, the inclination $\Delta Vi/\Delta t$ is affected by the change in the capacitance C along with the degradation, thus making it impossible to uniquely determine the correlation between the inclination $\Delta Vi/\Delta t$ and the balanced voltage Vr indicating the degree of degradation (decreasing with the degradation). The correlation varies depending on the internal structure, the shape, or the like of capacitors 11. Therefore, their correlation is experimentally predetermined and stored in the memory embedded in control circuit 15.

When the balanced voltage Vri is determined, control circuit 15 adds 1 to the subscript "i" and updates the contents of the subscript "i" (S317). Control circuit 15 then determines whether the updated subscript "i" is equal to the value obtained by adding 1 to "n" (n=4) indicating the number of capacitors 11 (S319). When the subscript "i" is determined not to be equal to "n+1" (NO in S319), this indicates that the balanced voltage Vri has not been determined yet for all capacitors 11. Therefore, the process returns to S313 to repeat the subsequent steps.

When the subscript "i" is determined to be equal to "n+1" (YES in S319), on the other hand, this indicates that the balanced voltage Vri has been determined for all capacitors 11. As a result, control circuit 15 assigns 1 to the subscript "i" (S321), thereby updating the balanced voltage Vri (S323).

The following is a description of how the balanced voltage Vri is updated. The final balanced voltage Vri of each capacitor 11 is determined according to the ratio between the balanced voltages Vri obtained in S315. More specifically, assuming that capacitor 11 having a subscript "i" of 4 is nearly brand new as shown in FIG. 10, the balanced voltage Vr4 is 2.5V. Next assume that capacitors 11 having a subscript "i" of 2 and 3, respectively, are slightly degraded and that their balanced voltages Vr2 and Vr3 are 2.45V each. Then assume that capacitor 11 having a subscript "i" of 1 is most degraded and that its balanced voltage Vr1 is 2.4V. Thus, the ratio between the voltages across capacitors 11 themselves having a subscript "i" of 1 to 4 is set at 2.4:2.45:2.45:2.5.

Capacitors 11 have a full charge voltage Vf of 10V, which is obtained by multiplying the rated voltage (2.5V) of each capacitor 11 by the number of capacitors 11 connected in series (4 in the present fifth exemplary embodiment). As a result, the balanced voltage Vri is determined in such a manner that the full charge voltage Vf is 10V, and that the ratio between the voltages across capacitors 11 themselves having a subscript "i" of 1 to 4 is 2.4:2.45:2.45:2.5. In other words, the balanced voltage Vri of each capacitor 11 can be updated by dividing it by the balanced voltage sum $\Sigma Vri$, which is their sum, and multiplying the result by the full charge voltage Vf of capacitors 11. This operation can be expressed by an equation: $Vri = Vf \cdot Vri/\Sigma Vri$. The $\Sigma$ is in the range of 1 to "n" (4 in the present fifth exemplary embodiment).

When the final balanced voltages Vr1 to Vr4 of respective capacitors 11 are calculated by assigning the above values to the equation, the results are as follows: $Vr1 \approx 2.45V$, $Vr2 = Vr3 = 2.5V$, $Vr4 \approx 2.55V$. As a result, higher degraded capacitors 11 can have a smaller voltage across themselves so as to delay the degradation. The less degraded capacitor 11 having a subscript "i" of 4 has a balanced voltage Vr4, which is much larger than the rated voltage. As a result, this capacitor 11 is applied with a voltage of about 2.55V in a full charge state, thereby being more degraded than the other capacitors 11. Determining the balanced voltage Vri in this manner allows the equalization of the degree of degradation of all capacitors 11. As a result, it is less likely that the electricity accumulating device is unable to be used because only one capacitor 11 reaches the degradation limit. As a result, the electricity accumulating device has a long life.

Referring again to FIG. 11, when the balanced voltage Vri is updated in S323, control circuit 15 compares the balanced voltage Vri with a degradation limit Vg (S325). The degradation limit Vg, which is also an experimentally predetermined value, represents the balanced voltage Vri when capacitors 11 are degraded to the limit of use. When the balanced voltage Vri becomes equal to or less than the degradation limit Vg (YES in S325), this indicates that the electricity accumulating device cannot be used any more. In this case, control circuit 15 transmits a signal indicative of degradation of the electricity accumulating device as a Data signal to the vehicular control circuit (S327). Upon receiving the Data signal, the vehicular control circuit informs the driver that the electricity accumulating device is in a degraded state and urges him/her to repair it, and at the same time, stops charging the electricity accumulating device. As a result, the electricity accumulating device is not used in a degraded state, thereby providing high reliability. After this, control circuit 15 terminates the subroutine of FIG. 11, and returns to the main routine.

When the balanced voltage Vri is larger than the degradation limit Vg (NO in S325), on the other hand, this indicates that the electricity accumulating device can be continued to be used. In this case, control circuit 15 adds 1 to the subscript "i", and updates the contents of the subscript "i" (S329). Control circuit 15 then determines whether the updated subscript "i" is equal to the value obtained by adding 1 to "n" indicating the number of capacitors 11 (S331). When the subscript "i" is determined not to be equal to "n+1" (NO in S331), this indicates that the balanced voltage Vri has not been determined yet for all capacitors 11. Therefore, the process returns to S323 to repeat the subsequent steps. When the subscript "i" is determined to be equal to "n+1" (YES in S331), on the other hand, this indicates that the balanced voltage Vri has been determined for all capacitors 11. As a result, control circuit 15 terminates the subroutine of FIG. 11 and returns to the main routine.

The above-described subroutine of the flowchart of FIG. 11 is summarized as follows.

Control circuit 15 first calculates the absolute value $\Delta Vi$ of the difference between the end-of-use-time voltage V1$i$ and the start-up-time voltage V2$i$ across each capacitor 11. Control circuit 15 then measures the first point of time t1 at which the end-of-use-time voltage V1$i$ is measured and the second point of time t2 at which the start-up-time voltage V2$i$ is measured. Control circuit 15 then calculates the time difference $\Delta t$ by subtracting the first point of time t1 from the second point of time t2. Control circuit 15 then calculates the balanced voltage Vri of each capacitor 11 from the predetermined correlation between the inclination $\Delta Vi/\Delta t$ and the balanced voltage Vr. The inclination $\Delta Vi/\Delta t$ is obtained by dividing the absolute value $\Delta Vi$ by the time difference $\Delta t$.

Control circuit 15 then divides the balanced voltage Vri of each capacitor 11 by the balanced voltage sum ΣVri, which is their sum, and multiplies the result by the full charge voltage Vf of capacitors 11 so as to update the balanced voltage Vri of each capacitor 11.

After this, control circuit 15 outputs the determined balanced voltages Vri to respective balanced voltage adjusting portions 13. Each balanced voltage adjusting portion 13 adjusts its balance switch 17 so that the voltage Vi across the capacitor 11 connected thereto becomes the balanced voltage Vri. When the voltage Vi across the capacitor 11 becomes larger than the balanced voltage Vri as a result that capacitors 11 have been charged with the regenerative electric power generated by braking, comparator 23 turns on balance switch 17. As a result, the capacitor 11 is discharged through balance resistor 19, and the voltage Vi across the capacitor 11 is reduced. Later when the voltage Vi across the capacitor 11 becomes substantially equal to the balanced voltage Vri, comparator 23 turns off balance switch 17. As a result, the discharge of the capacitor 11 is terminated, allowing the voltage Vi across the capacitor 11 to become the balanced voltage Vri as the target. This operation equalizes the degree of degradation of all capacitors 11, thereby extending their life.

In the present fifth exemplary embodiment, the balanced voltage Vri is updated every time the vehicle is started. As a result, the balanced voltage Vri is updated according to the degree of degradation of each capacitor 11, even if there are variations in the degree of degradation in all capacitors 11. This can equalize the degree of degradation of all capacitors 11 with high accuracy.

With the above-described structure and operation, the end-of-use-time voltage V1$i$ across each capacitor 11 is measured when the use of the vehicle is finished and in the non-charge-or-discharge period, and the start-up-time voltage V2$i$ across each capacitor 11 is measured when the vehicle is started next time and during the non-charge-or-discharge period of capacitors 11. Then, the absolute value ΔVi of the difference between the voltages V1$i$ and V2$i$ is calculated so as to determine the balanced voltage Vri. As a result, the electricity accumulating device is simplified in structure and operation, and has capacitors 11 whose life is extended accurately because of the influence of the insulation resistance value Rz and the capacitance C of each capacitor 11.

Sixth Exemplary Embodiment

Figure 12:
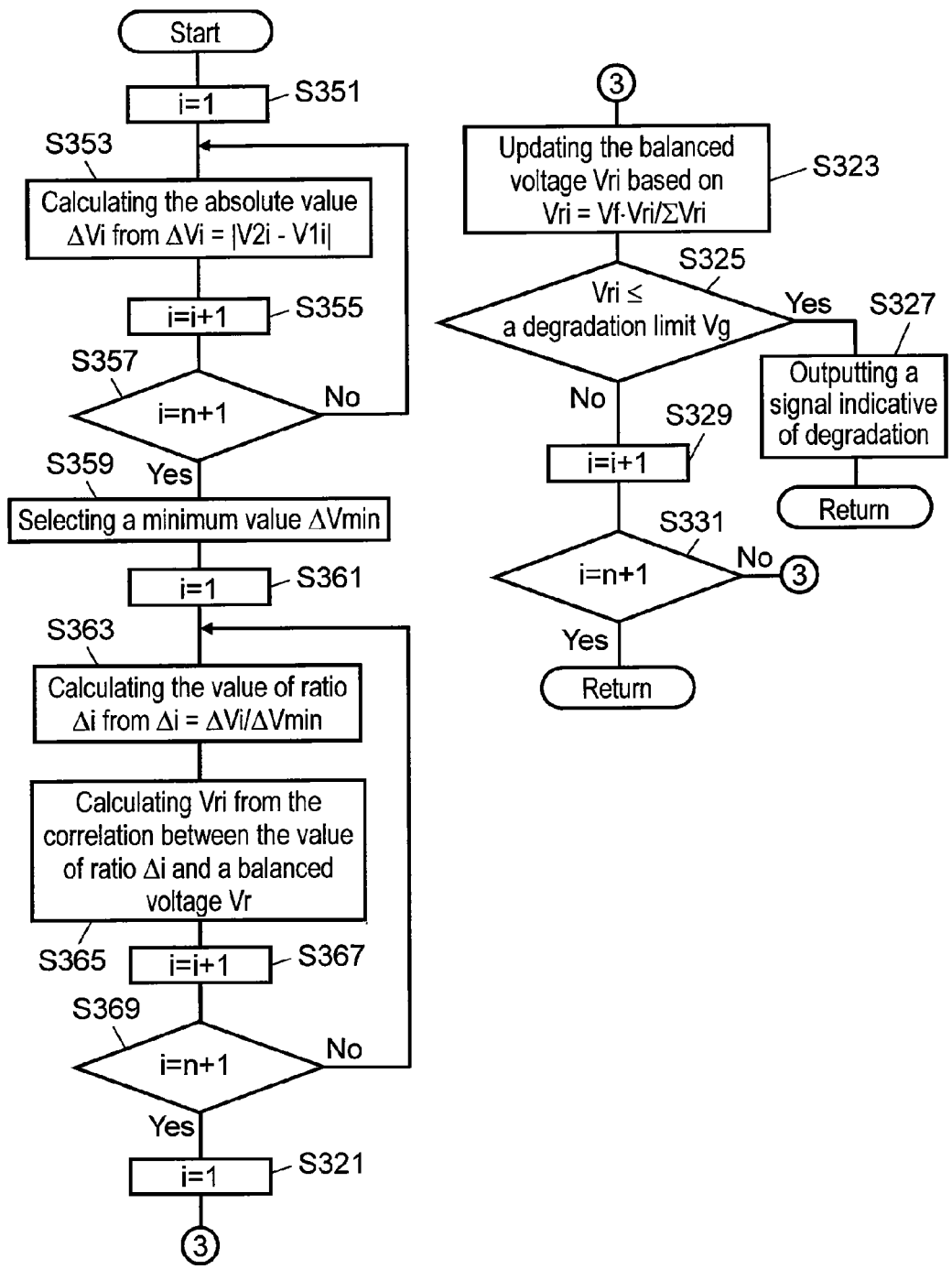
FIG. 12 is a flowchart showing a process for determining the balanced voltage of each capacitor in an electricity accumulating device according to a sixth exemplary embodiment of the present invention.

FIG. 12 is a flowchart showing a process for determining the balanced voltage of each capacitor in an electricity accumulating device according to a sixth exemplary embodiment of the present invention. The electricity accumulating device of the present sixth exemplary embodiment has the same structure as that of the first exemplary embodiment shown in FIG. 1, and hence, the description thereof will be omitted. The present sixth exemplary embodiment is characterized by its operation, which will be described in detail as follows.

Similar to the fifth exemplary embodiment, the end-of-use-time voltage V1$i$ across each capacitor 11 is measured when the use of the vehicle is finished and in the non-charge-or-discharge period, and the start-up-time voltage V2$i$ across each capacitor 11 is measured when the vehicle is started next time and during the non-charge-or-discharge period of capacitors 11. In the present sixth exemplary embodiment, however, it is unnecessary to measure the first and second points of time t1 and t2, so that its control is easier than in the fifth exemplary embodiment. The end-of-use-time voltage V1$i$ and the start-up-time voltage V2$i$ across each capacitor 11 are corrected by the temperature T in the same manner as in the fifth exemplary embodiment.

In this situation, control circuit 15 executes the subroutine of FIG. 12. In FIG. 12, like operations are labeled with like step numerals with respect to FIG. 11, and hence the description thereof will be omitted.

Control circuit 15 assigns 1 to the subscript "i" (S351). Then, control circuit 15 calculates the absolute value ΔVi of the difference between the end-of-use-time voltage V1$i$ and the start-up-time voltage V2$i$ across each capacitor 11 from an equation ΔVi=|V2$i$−V1$i$| (S353). Then, control circuit 15 adds 1 to the subscript "i" and updates it (S355), and determines whether the subscript "i" has reached the value obtained by adding 1 to "n" indicating the number of capacitors 11 (S357). When the subscript "i" is determined not to be equal to "n+1" (NO in S357), the process returns to S353 to repeat the operation to calculate the absolute value ΔVi of the next capacitor 11.

When the subscript "i" is determined to be equal to "n+1" (YES in S357), control circuit 15 selects a minimum value ΔVmin from the absolute values ΔVi (S359). In the case shown in FIG. 10, the ΔV4 becomes the minimum value ΔVmin. Next, control circuit 15 again assigns 1 to the subscript "i" (S361), and calculates the value of ratio Δi between each absolute value ΔVi and the minimum value ΔVmin based on an equation: Δi=ΔVi/ΔVmin (S363). The value of ratio Δi thus calculated indicates how much larger is the absolute value ΔVi than the minimum value ΔVmin, and is therefore, 1 or greater. The value of ratio Δi, which is calculated from the absolute value ΔVi, reflects the insulation resistance value Rzi and the capacitance Ci of each capacitor 11 in the same manner as in the fifth exemplary embodiment. Capacitor 11 corresponding to the minimum value ΔVmin has a voltage ΔVi across itself (ΔV4 in FIG. 10), which is equal to the minimum value ΔVmin. Therefore, Δi=1.

As obvious from FIG. 10, capacitor 11 having a value of ratio Δi of 1 has the smallest inclination, and hence, is least degraded. Capacitors 11 having a larger value of ratio Δi are more degraded. In FIG. 10, capacitor 11 having a subscript "i" of 1 is made degraded. Thus, the value of ratio Δi indicates the degree of degradation of capacitors 11. Next, control circuit 15 calculates the balanced voltage Vri of each capacitor 11 having the subscript "i" from the correlation between the value of ratio Δi and a balanced voltage Vr (S365). As described in the fifth exemplary embodiment, higher degraded capacitors 11 have a smaller balanced voltage Vri. Therefore, control circuit 15 stores the experimentally predetermined correlation between the value of ratio Δi and the balanced voltage Vr in the memory, and determines the balanced voltage Vri according to the value of ratio Δi calculated in S363. The correlation between the value of ratio Δi and the balanced voltage Vr cannot be uniquely determined either, and varies depending on the internal structure, the shape, or the like of capacitors 11. Therefore, their correlation is stored as a data tabled in the memory.

Next, control circuit 15 adds 1 to the subscript "i" and updates the contents of the subscript "i" (S367), and determines whether the updated subscript "i" is equal to the value obtained by adding 1 to "n" indicating the number of capacitors 11 (S369). When the subscript "i" is determined not to be equal to "n+1" (NO in S369), this indicates that the balanced voltage Vri has not been determined yet for all capacitors 11. Therefore, the process returns to S363 to repeat the subsequent steps.

When the subscript "i" is determined to be equal to "n+1" (YES in S369), on the other hand, this indicates that the balanced voltage Vri has been determined for all capacitors 11. As a result, control circuit 15 performs the operations from the next step S321 onward, thereby updating the balanced voltage Vri of each capacitor 11. Since the operations from the next step S321 onward are the same as those from S321 onward in FIG. 11, and hence, the description thereof will be omitted.

The above-described subroutine of the flowchart of FIG. 12 is summarized as follows.

Control circuit 15 first selects the minimum value $\Delta V_{min}$ from the absolute values $\Delta V_i$. Control circuit 15 then calculates the balanced voltage Vri of each capacitor 11 from the predetermined correlation between the balanced voltage Vr and the value of ratio $\Delta_i$ between each absolute value $\Delta V_i$ and the minimum value $\Delta V_{min}$. Control circuit 15 then divides the balanced voltage Vri of each capacitor 11 by the balanced voltage sum $\Sigma V_{ri}$, which is their sum, and multiplies the result by the full charge voltage Vf of capacitors 11 so as to update the balanced voltage Vri of each capacitor 11.

When the balanced voltage Vri has been determined, balanced voltage adjusting portions 13 adjust the voltage Vi across each capacitor 11 to the balanced voltage Vri, while capacitors 11 are being charged with the regenerative electric power generated when the vehicle is braked next time. This operation is the same as in the fifth exemplary embodiment. Therefore, also in the present sixth exemplary embodiment, the degree of degradation of all capacitors 11 can be equalized accurately, thereby extending the life of the electricity accumulating device.

With the above-described structure and operation, the end-of-use-time voltage V1i across each capacitor 11 is measured when the use of the vehicle is finished and in the non-charge-or-discharge period, and the start-up-time voltage V2i across each capacitor 11 is measured when the vehicle is started next time and during the non-charge-or-discharge period of capacitors 11. Then, the absolute value $\Delta V_i$ of the difference between the voltages V1i and V2i is calculated so as to determine the balanced voltage Vri from the ratio $\Delta_i$ between each absolute value $\Delta V_i$ and the minimum value $\Delta V_{min}$. This eliminates the need to measure the first and second points of time t1 and t2 unlike in the fifth exemplary embodiment. Thus, the life of capacitors 11 in the electricity accumulating device can be extended by a simple operation.

In the fifth and the sixth exemplary embodiments, control circuit 15 finally determines the balanced voltage Vri by updating its value in such a manner that the full voltage Vc becomes the full charge voltage Vf. However, the updating is unnecessary if the full voltage Vc is in the allowable input voltage range of the loads connected to the electricity accumulating device. More specifically, assume that capacitor 11 having a subscript "i" of 1 has a balanced voltage Vr1 of 2.5V, capacitors 11 having a subscript "i" of 2 and 3 have a balanced voltage Vr2 and Vr3, respectively, of 2.45V, and capacitor 11 having a subscript "i" of 4 has a balanced voltage Vr4 of 2.4V as described in the fifth exemplary embodiment. In this case, the $\Sigma V_{ri}$ (=Vc) as their sum is 9.8V, which is smaller than the full charge voltage Vf (=10V). However, in the case in which no problem arises even when the supply voltage to the loads is reduced to 9.8V, it is unnecessary to update the balanced voltage Vri.

In the fifth and the sixth exemplary embodiments, the end-of-use-time voltage V1i across each capacitor 11 is measured when the use of the vehicle is finished and during the non-charge-or-discharge period of capacitors 11. The end-of-use-time voltage V1i may alternatively be measured during the non-charge-or-discharge period of capacitors 11 when capacitors 11 are discharged until the full voltage Vc reaches a predetermined discharge voltage Vd after the use of the vehicle is finished. The predetermined discharge voltage Vd is predetermined as a voltage that little affects the degree of degradation of capacitors 11 (for example, half of the full charge voltage Vf). The full voltage Vc of capacitors 11 can be discharged, for example, by reducing the balanced voltage Vri to half and turning on balance switch 17, or by using the charge-discharge circuits (not shown).

Controlling the discharge until the full voltage Vc reaches the predetermined discharge voltage Vd can prevent capacitors 11 from being applied continuously with a voltage close to the rated voltage when the vehicle is not in use, thereby reducing the speed of the degradation of capacitors 11. In this case, however, the end-of-use-time voltage V1i across each capacitor 11 is smaller than in the fifth and the sixth exemplary embodiments, also making the absolute value $\Delta V_i$ smaller. Thus, a very low predetermined discharge voltage Vd reduces the influence on the degradation of capacitors 11, but decreases the accuracy of the balanced voltage Vri. Therefore, the predetermined discharge voltage Vd has an upper limit to reduce the degradation of capacitors 11. The upper limit preferably corresponds to about half the full charge voltage Vf.

In the first to the sixth exemplary embodiments, temperature sensors 25 are disposed near capacitors 11. Temperature sensors 25, however, are unnecessary such as when the electricity accumulating device is used as an emergency auxiliary power supply. This is because in such a case, the temperature T does not change very much, making it unnecessary to correct the voltage Vi across each capacitor 11 according to the temperature T.

In the first to the sixth exemplary embodiments, control circuit 15 outputs the signal indicative of degradation of the electricity accumulating device when the balanced voltage Vri becomes equal to or less than the degradation limit Vg. Alternatively, the signal may be outputted when the absolute value $\Delta V_i$ becomes equal to or more than a degradation upper limit $\Delta V_g$. The degradation upper limit $\Delta V_g$ represents the absolute value $\Delta V_i$ when the electricity accumulating device cannot be used any more, and may be predetermined and stored in the memory in control circuit 15. The absolute value $\Delta V_i$ increases with the degradation of capacitors 11 as mentioned above. Therefore, it is regarded as degradation when the absolute value $\Delta V_i$ becomes equal to or more than the degradation upper limit $\Delta V_g$, as opposed to when the balanced voltage Vri becomes equal to or less than the degradation limit Vg. This makes it possible to determine the degradation of the electricity accumulating device at the earliest possible time in the second and the fourth to the sixth exemplary embodiments. Alternatively, the signal indicative of degradation may be outputted when both the two determinations are performed and at least one of them is satisfied. This improves the accuracy of degradation determination.

In the first to the sixth exemplary embodiments, the degradation limit Vg or the degradation upper limit $\Delta V_g$ may be applied in two steps. In the first step, the vehicular control circuit may issue a warning to the driver and also control to limit the charging current. In the second step, the vehicular control circuit may control to stop charging to the electricity accumulating device as well as issuing the warning to the driver. As a result, it is much less likely that the electricity accumulating device is continued to be used after being degraded.

In the first to the sixth exemplary embodiments, capacitors 11 are electric double layer capacitors, but may alternatively be electrochemical capacitors or other types of capacitors.

In the first to the sixth exemplary embodiments, the electricity accumulating device is used in a hybrid vehicle. The electricity accumulating device can also be used in a vehicle auxiliary power supply in various systems such as a regenerative system of a vehicle, idling stop, electric power steering, a braking system, and an electric supercharger. The electricity accumulating device can also be used in an apparatus in which charge and discharge are performed by capacitors connected in series, such as an emergency auxiliary power supply other than vehicles.

Industrial Applicability

The electricity accumulating device of the present invention has capacitors whose life can be extended accurately by a simple operation, and hence, is useful particularly as an electricity accumulating vehicle having capacitors for storing and discharging electric power.

The invention claimed is:

1. An electricity accumulating device comprising:
a plurality of capacitors connected in series;
a plurality of balanced voltage adjusting portions connected to the capacitors respectively; and
a control circuit connected to the balanced voltage adjusting portions, wherein
the control circuit performs following operations:
measuring two voltages (V1i and V2i, where "i" is 1 to "n", where "n" represents the number of the capacitors) at different times from each other across each of the capacitors during a non-charge-or-discharge period of the capacitors by using the balanced voltage adjusting portions;
calculating an absolute value ($\Delta$Vi) of a difference between the two voltages (V1i and V2i) across each of the capacitors;
measuring a first point of time (t1) at which the voltage (V1i) is measured and a second point of time (t2) at which the voltage (V2i) is measured;
calculating a time difference ($\Delta$t) by subtracting the first point of time (t1) from the second point of time (t2);
calculating a voltage adjustment range ($\Delta$Vbi) by dividing the absolute value ($\Delta$Vi) by the time difference ($\Delta$t) and multiplying a result of said dividing by a specified coefficient (A);
determining the balanced voltage (Vri) by subtracting the voltage adjustment range ($\Delta$Vbi) from an initial balanced voltage (Vro); and
controlling the balanced voltage adjusting portions to make a voltage (Vi) across each of the capacitors the balanced voltage (Vri).

2. The electricity accumulating device of claim 1, wherein
the first point of time (t1) corresponds to a start-up time of the electricity accumulating device; and
the second point of time (t2) corresponds to a time when use of the electricity accumulating device is finished.

3. The electricity accumulating device of claim 1, wherein
the control circuit performs following operations:
selecting a minimum value ($\Delta$Vmin) among absolute values ($\Delta$Vi) from a measured result to the plurality of capacitors; and
calculating the voltage adjustment range ($\Delta$Vbi) from a predetermined correlation between a voltage adjustment range ($\Delta$Vb) and a value ($\Delta$i), which is the value of ratio between the absolute value ($\Delta$Vi) and the minimum value ($\Delta$Vmin).

4. The electricity accumulating device of claim 1, further comprising:
a temperature sensor near the capacitors, the temperature sensor having an output connected to the control circuit, wherein
the control circuit corrects the two voltages (V1i and V2i) across each of the capacitors according to a temperature (T) obtained from the temperature sensor, based on predetermined temperature dependence of the voltage (Vi).

5. An electricity accumulating device comprising:
a plurality of capacitors connected in series;
a plurality of balanced voltage adjusting portions connected to the capacitors respectively; and
a control circuit connected to the balanced voltage adjusting portions, wherein
the control circuit performs following operations:
measuring a non-charge-or-discharge-period voltage (V1i, where "i" is 1 to "n", where "n" represents the number of the capacitors) across each of the capacitors by using the balanced voltage adjusting portions, the voltage (V1i) being measured during a non-charge-or-discharge period of the capacitors;
measuring a charge-or-discharge-period voltage (V2i) across each of the capacitors by using the balanced voltage adjusting portions, the voltage (V2i) being measured when the capacitors are being continuously charged or discharged after the non-charge-or-discharge-period voltage (V1i) is measured;
calculating an absolute value ($\Delta$Vi) of a difference between the non-charge-or-discharge-period voltage (V1i) and the charge-or-discharge-period voltage (V2i);
measuring a first point of time (t1) at which the non-charge-or-discharge-period voltage (V1i) is measured, and a second point of time (t2) at which the charge-or-discharge-period voltage (V2i) is measured;
calculating a time difference ($\Delta$t) by subtracting the first point of time (t1) from the second point of time (t2);
calculating a voltage adjustment range ($\Delta$Vbi) by dividing the absolute value ($\Delta$Vi) by the time difference ($\Delta$t) and multiplying a result of said dividing by a specified coefficient (A);
determining the balanced voltage (Vri) by subtracting the voltage adjustment range ($\Delta$Vbi) from an initial balanced voltage (Vro); and
controlling the balanced voltage adjusting portions to make a voltage (Vi) across each of the capacitors the balanced voltage (Vri).

6. The electricity accumulating device of claim 5, wherein
the control circuit performs following operations:
selecting a minimum value ($\Delta$Vmin) among absolute values ($\Delta$Vi) from a measured result to the plurality of capacitors; and
calculating the voltage adjustment range ($\Delta$Vbi) from a predetermined correlation between a voltage adjustment range ($\Delta$Vb) and a value ($\Delta$i), which is the value of ratio between the absolute value ($\Delta$Vi) and the minimum value ($\Delta$Vmin).

7. The electricity accumulating device of claim 5, wherein
the control circuit determines the balanced voltage (Vri) every time the capacitors enter a non-charge-or-discharge state.

8. The electricity accumulating device of claim 5, wherein
the control circuit calculates inclination of voltage ($\Delta$Vc) of a full voltage (Vc) of the capacitors connected in series every time a predetermined time (ts) passes after an initial voltage rise or drop, the initial voltage rise or drop being caused by an internal resistance (R) of all capacitors immediately after charge or discharge of the capacitors is started; and
the control circuit measures the charge-or-discharge-period voltage (V2i) when the inclination of voltage ($\Delta$Vc)

has the same sign as and a smaller absolute value than a previous inclination of voltage ($\Delta Vco$).

9. The electricity accumulating device of claim 5, wherein the control circuit calculates the charge-or-discharge-period voltage (V2i) when a charge-discharge current (I) to be supplied from the capacitors to the control circuit has a same sign as and a smaller absolute value than a previous charge-discharge current (Io) every time a predetermined time (ts) passes after an initial voltage rise or drop, the initial voltage rise or drop being caused by an internal resistance (R) of all capacitors immediately after charge or discharge of the capacitors is started.

10. The electricity accumulating device of claim 5, further comprising:
    a temperature sensor near the capacitors, the temperature sensor having an output connected to the control circuit, wherein
    the control circuit corrects the non-charge-or-discharge-period voltage (V1i) and the charge-or-discharge-period voltage (V2i) according to a temperature (T) obtained from the temperature sensor, based on predetermined temperature dependence of the voltage (Vi).

11. An electricity accumulating device comprising:
    a plurality of capacitors connected in series;
    a plurality of balanced voltage adjusting portions connected to the capacitors respectively; and
    a control circuit connected to the balanced voltage adjusting portions, wherein
    the control circuit performs following operations:
        measuring an end-of-use-time voltage (V1i, where "i" is 1 to "n", where "n" represents the number of the capacitors) across each of the capacitors by using the balanced voltage adjusting portions, the end-of-use-time voltage being measured when use of the electricity accumulating device is finished and during a non-charge-or-discharge period of the capacitors;
        measuring a start-up-time voltage (V2i) across each of the capacitors by using the balanced voltage adjusting portions, the start-up-time voltage (V2i) being measured when the electricity accumulating device is started next time and during the non-charge-or-discharge period of the capacitors;
        calculating an absolute value ($\Delta Vi$) of a difference between the end-of-use-time voltage (V1i) and the start-up-time voltage (V2i);
        measuring a first point of time (t1) at which the end-of-use-time voltage (V1i) is measured and a second point of time (t2) at which the start-up-time voltage (V2i) is measured;
        calculating a time difference ($\Delta t$) by subtracting the first point of time (t1) from the second point of time (t2);
        calculating a balanced voltage (Vri) of each of the capacitors from a predetermined correlation between an inclination ($\Delta Vi/\Delta t$) and the balanced voltage (Vr), the inclination ($\Delta Vi/\Delta t$) being obtained by dividing the absolute value ($\Delta Vi$) by the time difference ($\Delta t$); and
        controlling the balanced voltage adjusting portions to make a voltage (Vi) across each of the capacitors the balanced voltage (Vri).

12. The electricity accumulating device of claim 11, wherein
    the control circuit performs following operations:
        selecting a minimum value ($\Delta Vmin$) among absolute values ($\Delta Vi$) from a measured result to the plurality of capacitors; and
        calculating the balanced voltage (Vri) from a predetermined correlation between the balanced voltage (Vr) and a value ($\Delta i$), which is the value of ratio between the absolute value ($\Delta Vi$) and the minimum value ($\Delta Vmin$).

13. The electricity accumulating device of claim 11, wherein
    the control circuit updates the balanced voltage (Vri) of each of the capacitors by dividing the balanced voltage (Vri) by a balanced voltage sum ($\Sigma Vri$) as a sum of all balanced voltages (Vri), and multiplying a result by a full charge voltage (Vf) of all capacitors.

14. The electricity accumulating device of claim 11, further comprising:
    a temperature sensor near the capacitors, the temperature sensor having an output connected to the control circuit, wherein
    the control circuit corrects the end-of-use-time voltage (V1i) and the start-up-time voltage (V2i) across each of the capacitors according to a temperature (T) obtained from the temperature sensor, based on predetermined temperature dependence of the voltage (Vi) across each of the capacitors.

15. The electricity accumulating device of claim 1, wherein
    the control circuit outputs a signal indicative of degradation when the balanced voltage (Vri) becomes not more than a degradation limit (Vg) or when the absolute value ($\Delta Vi$) becomes not more than a degradation upper limit ($\Delta Vg$).

16. The electricity accumulating device of claim 5, wherein
    the control circuit outputs a signal indicative of degradation when the balanced voltage (Vri) becomes not more than a degradation limit (Vg) or when the absolute value ($\Delta Vi$) becomes not more than a degradation upper limit ($\Delta Vg$).

17. The electricity accumulating device of claim 11, wherein
    the control circuit outputs a signal indicative of degradation when the balanced voltage (Vri) becomes not more than a degradation limit (Vg) or when the absolute value ($\Delta Vi$) becomes not more than a degradation upper limit ($\Delta Vg$).

* * * * *